United States Patent [19]

Ohnishi

[11] Patent Number: 5,680,198
[45] Date of Patent: Oct. 21, 1997

[54] COPYING MACHINE

[75] Inventor: Kazuyuki Ohnishi, Yamatokooriyama, Japan

[73] Assignee: Sharp Kabushiki Kaisha, Osaka, Japan

[21] Appl. No.: 514,903

[22] Filed: Aug. 14, 1995

Related U.S. Application Data

[63] Continuation of Ser. No. 166,198, Dec. 10, 1993, abandoned.

[30] Foreign Application Priority Data

Dec. 11, 1992 [JP] Japan ................... 4-353111

[51] Int. Cl.⁶ ........................................... G03G 15/01
[52] U.S. Cl. ............... 355/23; 355/313; 355/218; 358/296
[58] Field of Search ............... 355/23, 313, 218, 355/308, 311, 320; 358/296

[56] References Cited

U.S. PATENT DOCUMENTS

| | | | |
|---|---|---|---|
| 4,833,721 | 5/1989 | Okutomi et al. | 382/21 |
| 4,935,786 | 6/1990 | Veeder | 355/319 |
| 5,003,614 | 3/1991 | Tanaka et al. | 382/18 |
| 5,055,886 | 10/1991 | Nakatani et al. | 355/326 |
| 5,109,439 | 4/1992 | Froessl | 382/61 |
| 5,136,665 | 8/1992 | Inoue | 355/23 |
| 5,167,016 | 11/1992 | Bagley et al. | 395/144 |
| 5,185,821 | 2/1993 | Yoda | 382/61 |
| 5,293,432 | 3/1994 | Gonser et al. | 382/47 |
| 5,333,039 | 7/1994 | Sagara | 355/218 |

FOREIGN PATENT DOCUMENTS

| | | |
|---|---|---|
| 0 478 351 A2 | 4/1992 | European Pat. Off. |
| A-53-110830 | 9/1978 | Japan |
| 60-026208-B2 | 3/1979 | Japan |
| 2 002 291 | 2/1979 | United Kingdom |

OTHER PUBLICATIONS

Engl. abstract of Japanese Patent No. 60–026208–B2 Jun. 22, 1985 corresponding to published application (Kokai) JP 54–037744 of Mar. 20, 1979.
*Patent Abstracts of Japan*, vol. 11, No. 343 (1987).
*Patent Abstracts of Japan*, vol. 16, No. 98 (1992).
*Patent Abstracts of Japan*, vol. 17, No. 220 (1993).
*Patent Abstracts of Japan*, vol. 13, No. 533 (1989).
*Patent Abstracts of Japan*, vol. 14, No. 376 (1990).
*Patent Abstracts of Japan*, vol. 14, No. 529 (1990).

*Primary Examiner*—Safet Metjahic
*Assistant Examiner*—D. P. Malley
*Attorney, Agent, or Firm*—David G. Conlin; Milton Oliver

[57] ABSTRACT

A copying machine is disclosed which is capable of copying an original document having a page number by preliminarily erasing or correcting the page number portion of the image and by changing the order of the output images according to their respective page numbers or by changing the path for delivering the sheet of paper to be copied. A document page image read-in by a charge coupled device sensor is converted into digital signals which are corrected for shading and then binarized and stored in an image memory. This image data is transferred to a working memory wherein the page number shown on the document is read by a page number recognizing unit. The control unit checks the page number and allocates a binding margin on a suitable portion of the document's image. On the basis of the recognition of the page number on the document's image, it also decides to copy the document on one side of the sheet of paper and to deliver it out, or to copy the next document onto the other side of the sheet of paper.

5 Claims, 39 Drawing Sheets

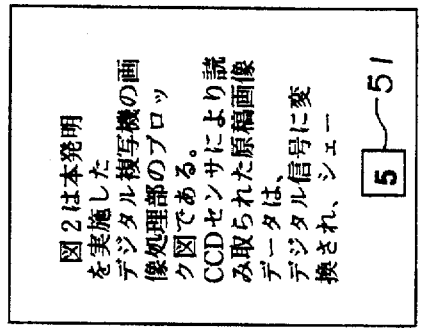
FIG.6 A
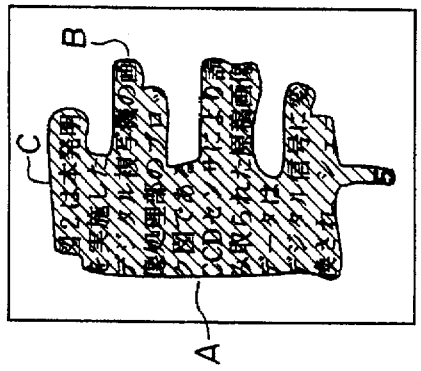
FIG.6 B
FIG.6 C
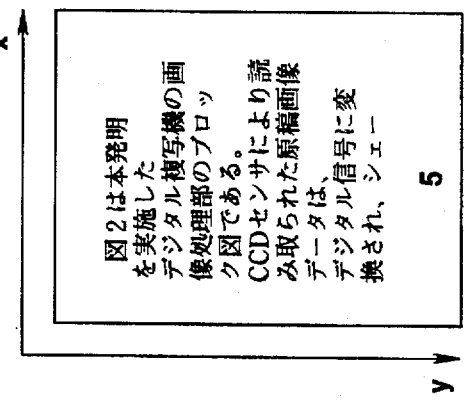
FIG.6 D
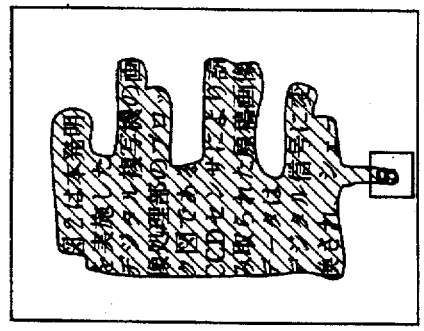
FIG.6 E
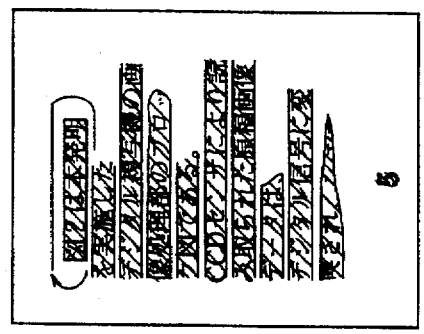

FIG.7 A
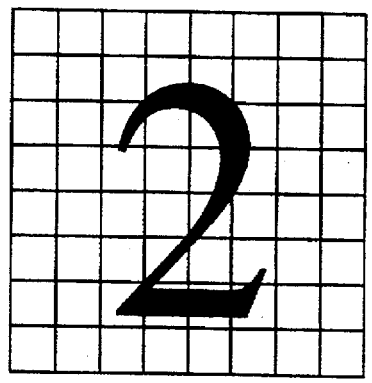
FIG.7 B
| 0 | 0 | 0 | 0 | 0 | 0 | 0 |
|---|---|---|---|---|---|---|
| 0 | 0 | 1 | 3 | 3 | 1 | 0 |
| 0 | 0 | 5 | 2 | 1 | 5 | 0 |
| 0 | 0 | 0 | 0 | 1 | 4 | 0 |
| 0 | 0 | 0 | 2 | 7 | 0 | 0 |
| 0 | 0 | 2 | 5 | 1 | 0 | 0 |
| 0 | 0 | 6 | 8 | 5 | 5 | 0 |
| 0 | 0 | 0 | 0 | 0 | 0 | 0 |
FIG.7 C
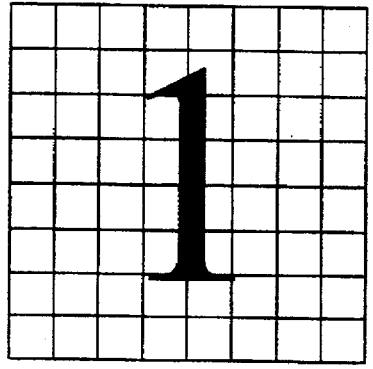 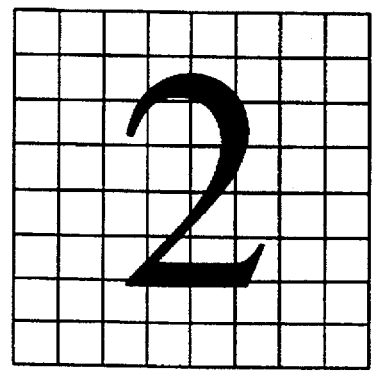

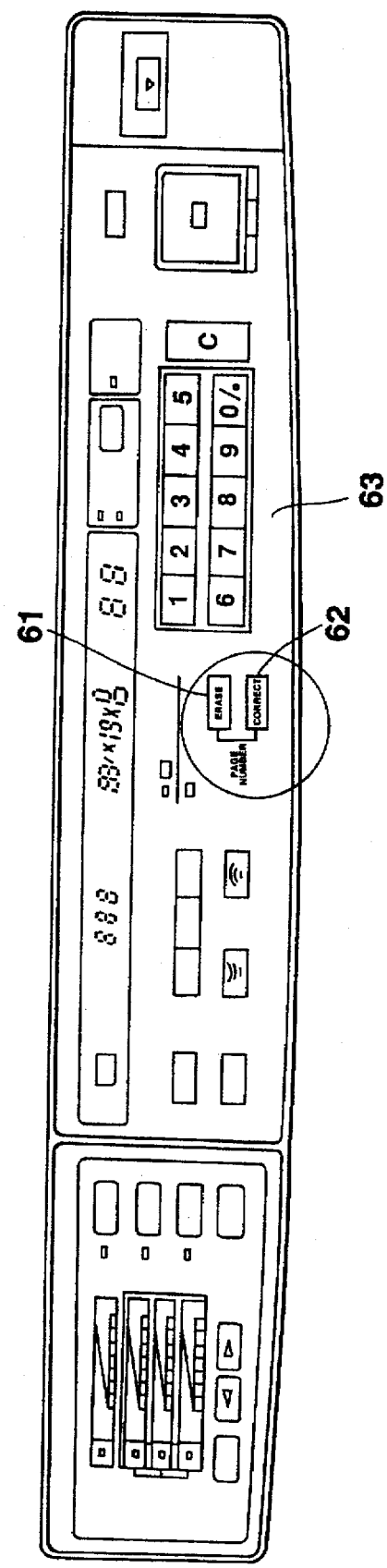
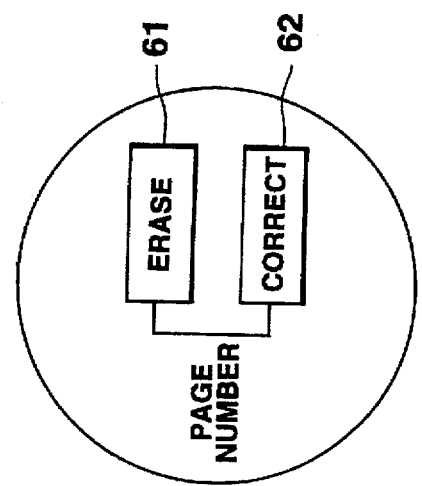
FIG.37
FIG.37A

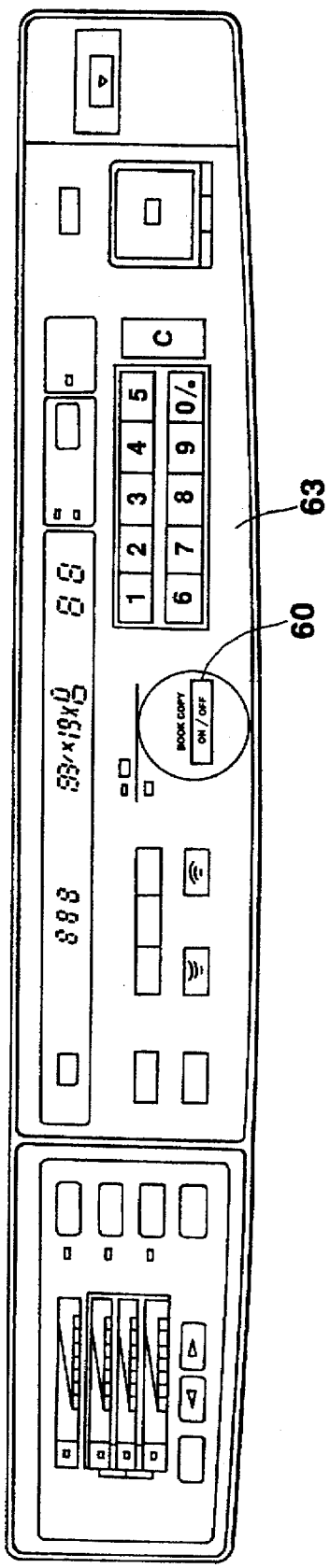
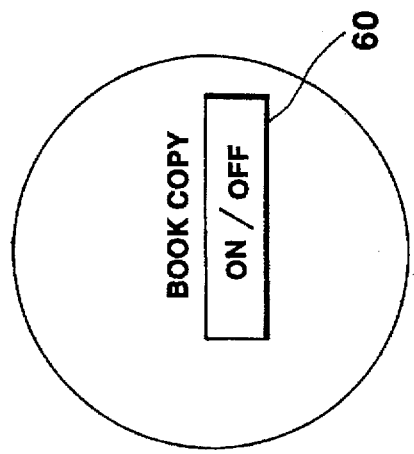
FIG.39
FIG.39A

COPYING MACHINE

This is a continuation of application Ser. No. 08/166,198 filed on Dec. 10, 1993 now abandoned.

BACKGROUND OF THE INVENTION

The present invention relates to a copying machine and, more particularly, to a copying machine which is provided with a page number recognizing unit for recognizing the page number of an original document.

A variety of copying machines have been previously proposed but such copying machines which are capable of recognizing the page number on a document to be copied have not been proposed.

There was no copying machine which was capable of automatically adjusting the binding margins of an image to be copied and of controlling the front and reverse sides of a sheet of paper in such a way that the originals having page numbers printed thereon, especially, pages of a book might be copied exactly on both sides of a sheet of paper in a two-sided copying mode not requiring the user to specify the order of copying or to arrange the documents a certain way.

There was no copying machine which was capable of erasing the page number on an original image or of correcting only a page number portion thereon nor of changing the order of the images to be copied or of selecting the route for delivering a sheet of paper according to the page number of the original image.

The Japanese publication of the examined application No. JP, B2, 60-26208 describes such a conventional two-sided copying machine which is capable of continuously illuminating two spread pages of a book or document and of copying the two pages on two separate sheets of paper respectively Another double sided copying machine is described in the Japanese publication of unexamined application No. JP, A, 53-110830, SATOMI which is characterized by the ability to control the binding margin at printing the front side and the back side of a sheet of paper so as to match two image copying areas with each other on both sides of a sheet of paper.

Both references fail to disclose anything relating to a method for controlling the operations of a two-sided copying machine according to the results of the recognizing of page numbers on a document's image.

Any conventional copying machine has the following drawbacks:

When copying originals (e.g., a book) having respective page numbers on both sides of a sheet of paper with the same binding margin by using any conventional copying machine, an operator is required to specify the direction of the placement of the originals on the copying machine. Similarly, to get a copy having the same printed sides as the original, the operator must specify the order of copying or select one-sided copying for the first page of the documents. That may impair the efficiency of the machine's operation and easily cause mis-copying.

When preparing materials containing copies of the originals (e.g., a book) having respective page numbers, each copy may have two page numbers—the page number copied from the original and the page number on the final draft. Such mixed numbering decreases the quality of the document.

When copying a plurality of different pages e.g., a book, the copies will have discontinuous numbers that may cause problems in arranging the documents.

A book is usually edited to have the chapters, each of which starts from the right side leaving the left side blank if the preceding chapter ends at the right side. Consequently, the conventional copying machine may copy a blank page as long as the user is not aware of it. On the contrary, if such original pages are copied on both sides of the sheets of paper, omitting the blank pages, the copies cannot correctly correspond to the originals.

In addition, when copying originals (e.g. pages of a book) having page numbers on both sides of the paper with the same order as the originals, it is necessary for the operator to decide which page (right or left) of the spread of the book is to be copied first. This decreases the effectiveness of the copying machine.

SUMMARY OF THE INVENTION

It is an object of the present invention to provide a copying machine which is capable of automatically preparing a binding margin on a sheet of paper to be printed on both sides without taking special care of the order of copying and the directions for placement of an original when copying the original such as the spread of pages in a book and which is also capable of copying the front and back printed sides of an original onto the corresponding sides of a sheet of paper. This will increase the reliability of the machine and minimize the possibility of mis-copying.

When preparing materials containing copies from originals (e.g. a book) having respective page numbers, the copying machine according to the present invention, which possesses at least one function to erase the page number portion of an original image or to replace the page number of the original image by a page number to be determined according to the order of the copying done or to correct the page number according to the number on an image to be copied, may produce copy without printing the unnecessary page numbers.

When copying a plurality of different kinds of documents, the copying machine may correct the page number of each original image according to the operator's instructions. This function can newly page the copies which then can be easily edited.

When copying originals divided by chapters, the machine can automatically avoid copying a blank page of paper inserted between the last page of the current chapter and the page of the next chapter and can correct the paging of images to be copied on both sides of a sheet of paper, thereby assuring the correct continuity of copies. This function improves the reliability of the machine and prevents mis-copying.

In addition, when copying paged originals, the machine can always produce copies with the correct paging requiring no aid from the operator. It can also prevent double copying of the same page if the operator inadvertently places the original on the machine twice. It is capable of storing images without over-flowing at random copying of differently paged originals to assure the correct paging of copies and their easy editing. This function makes the machine easier to operate and increases the effectiveness of the operation with a minimum of waste.

A book usually has at its spread a left-hand leaf paged with an even number and right-hand leaf paged with an odd number. When copying both sides of the pages of a book, the page number of the original image is recognized and an image shifting value is adjusted so that the same binding margin as that of the left-hand and right-hand pages of a book may be provided at correct positions on respective copies. In addition, the read-in original images can be temporarily stored so that both sides of a leaf of the book may be correctly copied on the respective sides of paper regardless of which page is first copied, i.e., the same perfected copy as the both-sided printed leaf of the book may be automatically obtained regardless of the order of copying.

When preparing materials using copies from some pages of a book, it is possible to recognize the page number of each original and to erase it in the original image to be copied. This prevents the prepared materials from having unnecessary page numbers. It is also possible to replace the page numbers of original images by page numbers determined by a starting page number as specified by means of a control unit or to correct page numbers of original images by page numbers determined by the order of the images to be copied. This assures us of getting correctly paged copies to be easily edited.

Books may have a vacant numberless page between chapters. According to the present invention, it is possible to detect such a numberless blank page of a book by means of an alarm. The user may separate a copy and/or temporarily select the one-sided copying mode to copy the image of a chapter heading page on a sheet of a right-hand sided page. The correct paging of copies is thus assured.

When copying the pages of a book, for example, in the order of pages Nos. 3, 2, 5 and 4, copies (or images) No's 3 and 2 are stored in an intermediate tray (or image memory units) until page No. 5 is recognized, and the copies No. 2 and No. 3 are delivered out in said order. After page No. 4 is copied, copies No's 4 and 5 are successively delivered out. After this, an alarm is set off when the discontinuity of the page numbers of the images to be copied occur. Correct piling of copies on an outlet tray is realized regardless of which side of the page of a book is first copied.

The present invention is intended to provide a copying machine which is capable of: controlling the binding, margin preparation at two-sided copying according to the result of the recognition of a page's number in an original document; controlling relationships between the front side and the back side of a sheet of paper in two-sided copying according to the result of recognizing a page number on an original document; erasing or correcting a page number on an image according to the result of recognizing a page number's position or a page number on a document; generating an alarm when failing to recognize a page number on a document to be copied; recognizing the existence or absence of a page number on a document to be copied and of copying a numberless page at the top or the reverse side of a sheet of paper when copying both sides of it; changing at least either the order for putting out an image to be copied or the path for delivering the copy according to the recognition of the page number on a document's image.

BRIEF DESCRIPTION OF DRAWING

FIGS. 6A, 6B, 6C, 6D and 6E are views for explaining the operations of a page number recognizing unit.

FIGS. 7A, 7B and 7C are views for explaining an example of the method for recognizing a page number.

FIG. 37 is a view showing an example of a control panel for the present invention, and FIG. 37A is an enlarged detail thereof. FIG. 39 is a view showing an example of a control panel of the present invention; and FIG. 39A is an enlarged detail thereof.

PREFERRED EMBODIMENT OF THE INVENTION

Figure 1:
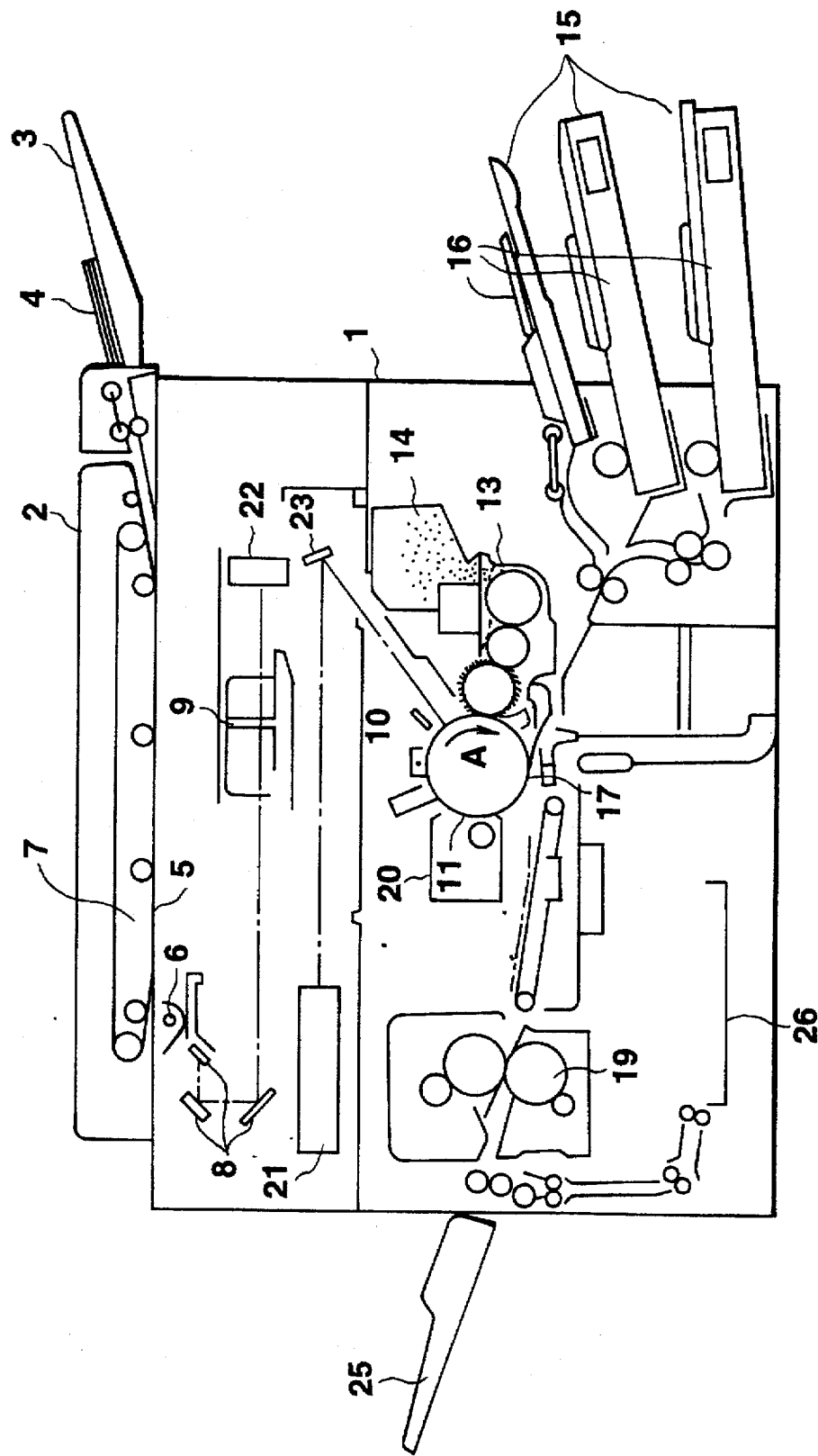
FIG. 1 is a sectional view for explaining an example of a copying machine embodied in the present invention.

Referring now to the accompanying drawings, preferred embodiments of the present invention will be described in detail as follows:

FIG. 1 is a sectional view for explaining an example of a digital copying machine embodied in the present invention.

The copying machine has a body 1 and a document feeding device 2 for automatically transferring an original 4 from a document feeding tray 3 to a specified position 5 where the original is subjected to exposure.

Usually, an operator places the original 4 at the exposed position 5 on the copying machine before actually copying. The automatic document feeding device 2 is used in the case of copying a separate sheet of an original 4. When the exposure lamp 6 illuminates an original 7, the reflected light from the original 7 is reflected on a mirror 8 then passes through a lens 9 and enters into a CCD sensor 22 by which it is converted into electrical signals.

Figure 2:
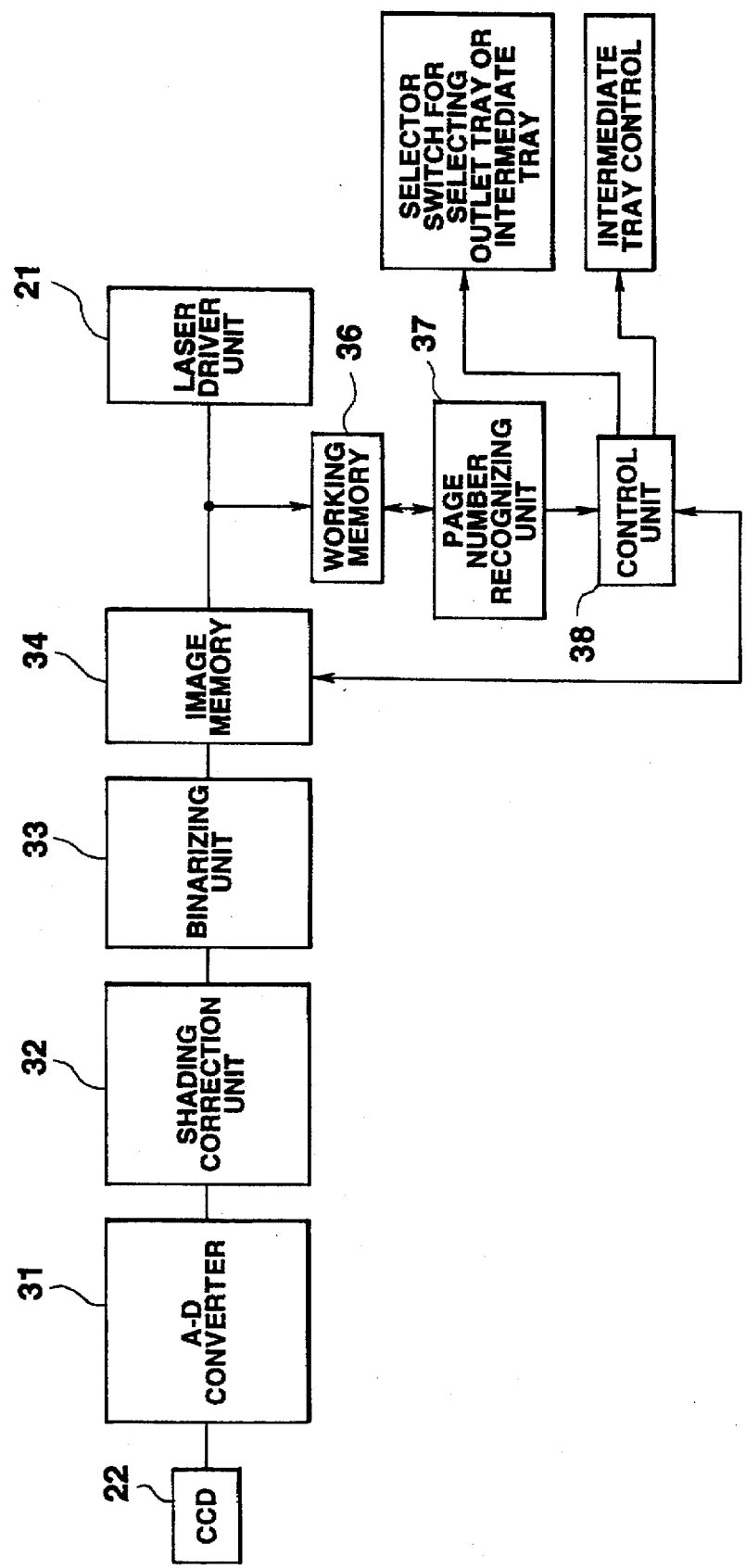
FIG. 2 is a block diagram for explaining the image processing portion of a copying machine of the present invention defined in claims 1 and 2.

Image data taken through the CCD sensor 22 is processed by an image processor shown in FIG. 2 and then fed to a laser driver 21 which generates a laser light which is ON-OFF controlled according to the received image data, The laser light is directed by the means of a mirror 23 to a light-sensitive drum 11 which is being rotatable in the direction shown by the arrow A. Since the light-sensitive drum 11 is evenly charged before being exposed to the laser light by the charging device 10 placed at the up-stream side of the drum rotating direction, relative to the exposed position of the drum, an electrostatic latent image is formed on the electrically charged surface of the light-sensitive drum 11 by the action of the laser light.

The latent image formed on the light-sensitive drum 11 is developed with the use of toner 14 fed from a developing container 13 to form a toner image which is then transferred by the copying unit 17 to a sheet of paper 16 fed from a paper cassette 15 and fixed thereon by a fixing unit 19. The sheet of paper printed on one side is delivered to a face-up tray 25 or a face-down tray 26. Toner, remaining on the light-sensitive drum 11, is cleared off by a cleaning unit 20.

FIGS. 2 to 5 are block diagrams for explaining examples of respective image processing portions of copying machines embodied in the present invention. Original image data read-in through a CCD sensor 22 are converted on an A—D converter 31 into digital signals which are corrected by a shading correction unit 32, binarized by a binarizing unit 33 and stored in an image memory 34.

In the embodiment of FIG. 2, a page number recognizing unit 37 reads a page number printed on the original from its image data stored in the image memory 34 using a working memory 36 for image data that is connected to the page number recognizing unit 37 for the page number recognizing process. The image data stored in the image memory 34 is transferred to a laser driver unit 21 to control exposure to laser light. A control unit 38 checks the page number and provides a binding margin at a suitable position on the stored image. In the case shown a binding margin of about 20 mm is provided.

Furthermore, the control unit 38 decides whether a sheet is to be printed on one side or both according to the page number recognized.

Figure 3:
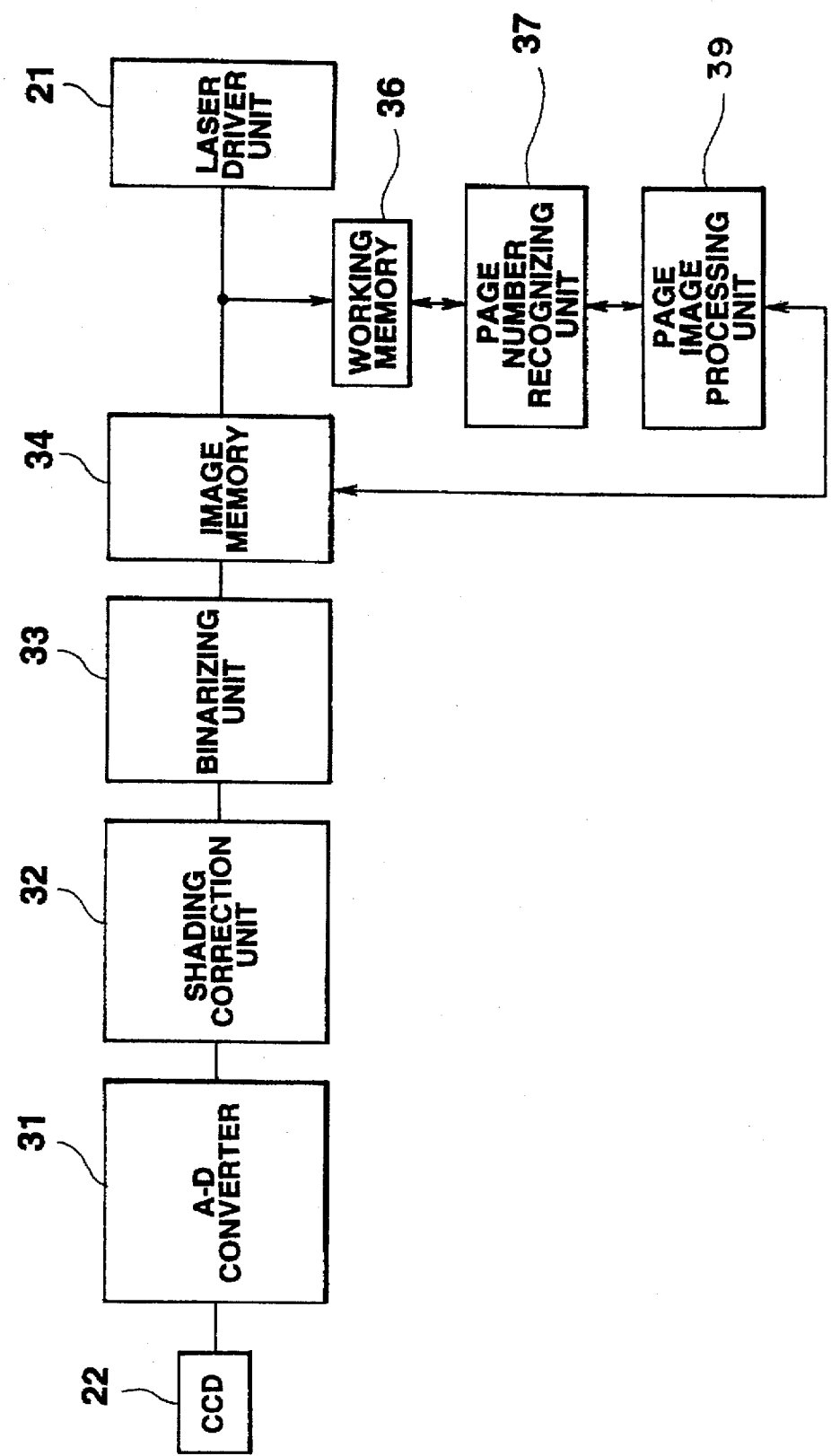
FIG. 3 is a block diagram for explaining the image processing portion of a copying machine of the present invention defined in claim 3.

In the embodiment for FIG. 3, the page number recognizing unit 37 reads the page number printed on the original from its image data stored in the image memory 34 by using the working memory 36 that is connected to the page number recognizing unit 37 for the page number recognizing process. The image data stored in the image memory 34 is transferred to a laser driver unit 21 to be control exposure to laser light. A page image processing unit 39 performs the processing(erasing-correcting) of the page number portion of the image memory 34 according to the recognition made by the page number recognizing unit 37.

Figure 4:
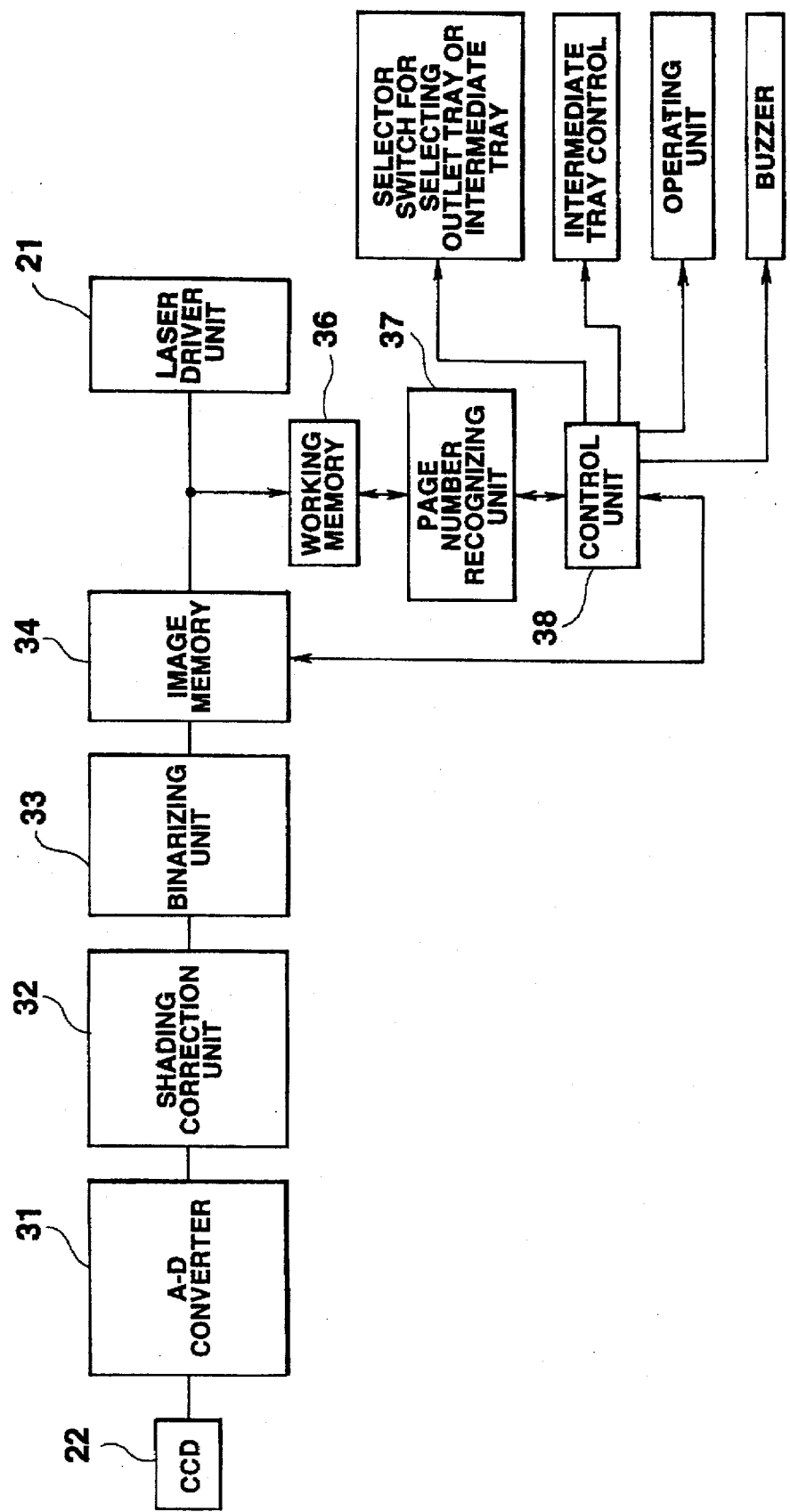
FIG. 4 is a block diagram for explaining the image processing portion of a copying machine of the present invention defined in claims 4 and 5.

In the embodiment of FIG. 4, a control unit 38 performs checking for the presence or absence of a page number by generating an alarm signal by a buzzer and the decision for copying on the front or the back side of a sheet of paper on the basis of the page number recognizing result.

Figure 5:
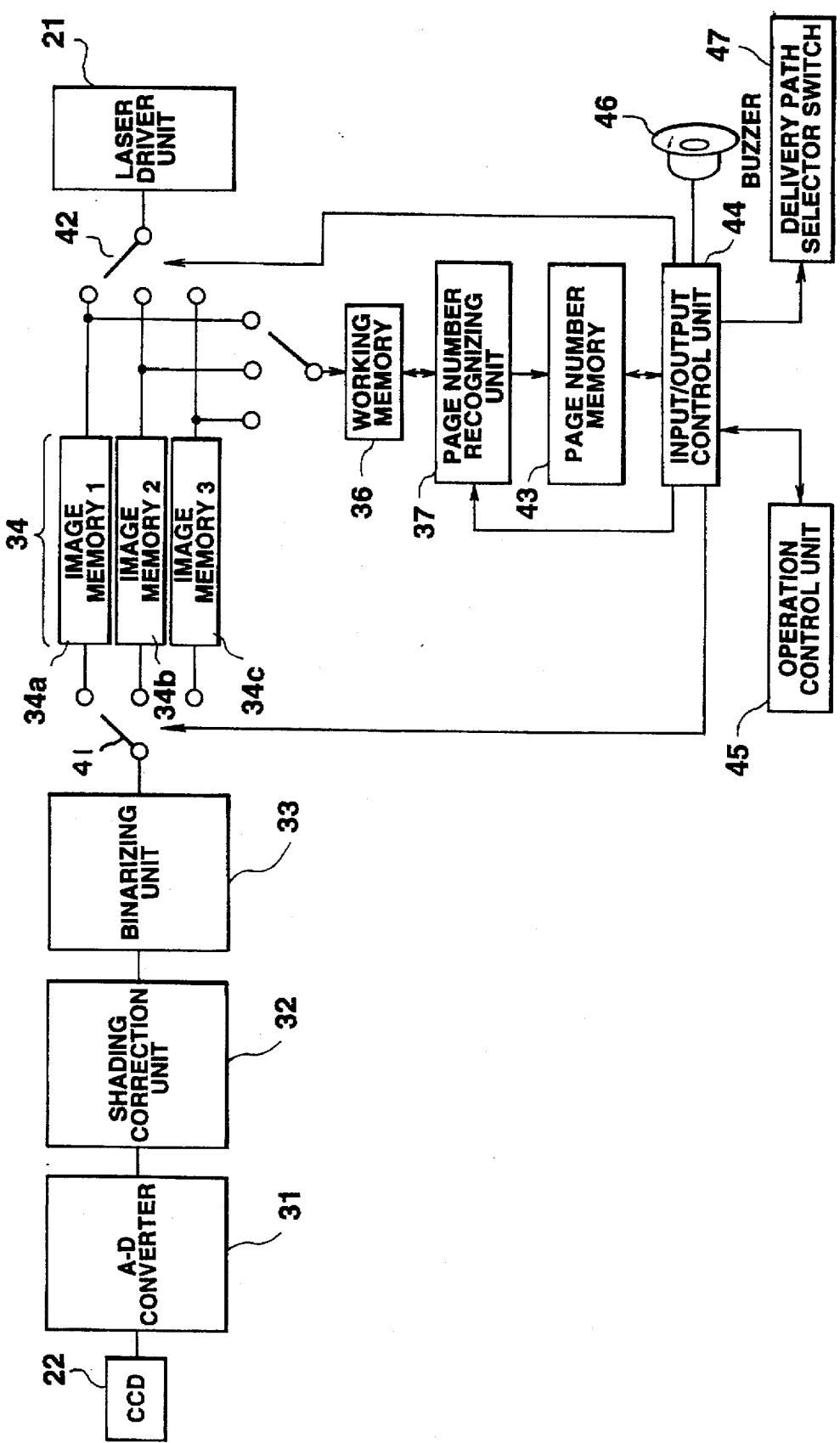
FIG. 5 is a block diagram for explaining the image processing portion of a copying machine of the present invention defined in claims 8 and 9.

In the embodiment of FIG. 5, the image memory 34 has three memory units 34a, 34b and 34c for temporarily storing three separate pages of images in order to realize the function for changing the order of producing them.

An image selector switch 41 provided between the binarizing unit 33 and the image memory 34 (memory units 34a, 34b and 34c) actuates to select one of the three image memory units according to the instructions from an input/output control unit.

A page number recognizing unit 37 reads the page number printed on the original from its image data stored in the image memory 34 using the working memory 36 that is connected to the page number recognizing unit 37 for page number recognizing processing.

The page numbers read out of the image data are arranged in the format shown in table 1 and stored in the page number memory 43 which is composed of a random access memory chip allowing access from the page number recognizing unit 37 and the input/output control unit 44. The input/output control unit 44 checks the page number and selects a suitable image memory. At the same time, when the originals are read in the ascending order of their page numbers, a delivery path selector switch 47 is preset to deliver the copies toward a face-down receiving tray 26 as shown in FIG. 1. When the originals are read in the descending order of their page numbers, the delivery path selector switch 47 is preset to direct copies toward the face-up receiving tray 25 as shown in FIG. 1.

The image data from the selected image memory units 34a, 34b and 34c are sent to a laser driver unit 21 which transfers the image by laser light to an electrically charged rotating light-sensitive drum 11. The input/output control unit 44 turns the buzzer ON 46 for causing an alarm when the result of checking on page numbers indicates that the two images having the same page number are stored in the image memory units 34a, 34b and 34c or the operator tries inputting the next original in spite of the absence of a vacant image memory.

TABLE 1

| Original No. | Image memory No. | Page No. |
| --- | --- | --- |
| 1 | 1 | 10 |
| 2 | 2 | 11 |
| 3 | 3 | 9 |
| 4 | 2 | 8 |
| 5 | 1 | 6 |
| 6 | 3 | 7 |
| 7 | 2 | 4 |
| 8 | 3 | 5 |
| 9 | 1 | 3 |

The number "n" of an original indicates that the original was read in the n-th place after starting the work of copying.

Table 1 shows an example of a memory format of the page number memory 43 which is comprised of memory units. The number in the left column "Original No." means the original number that was scanned. In the middle column of table 1 are shown the numbers of image memory units in which respectively scanned images are stored and in the right column are shown recognized page numbers of the originals. Although table 1 contains originals No's 1 to 9, the practical image memory has enough capacity to process and store the images to be copied.

FIGS. 6A to 8E illustrate the steps for processing the page number recognizing unit. In the shown case, the page number recognizing unit identifies an area containing black pixels on an original image and recognizes the digit pattern in a specified convex-bordered portion of the area or the isolated portion of black pixels as the original's page number. Since image data read in through a CCD sensor 22 is binarized, the image data stored in the image memory are subjected at first to smoothing to remove small separate black pixels produced by the effect of noises before processing (FIG. 6A). Since the background of the original document is usually blank, an area occupied by black pixels on the original image is determined and, at the same time, it is filled with black pixels and its boundary is smoothed to obtain the pattern shown in FIG. 6B.

FIGS. 6C to 6E illustrate how to specify the location of a page number on an image after the processing step of FIG. 8B. There are two methods, one of which is to determine the location of the page number by comparing the convex portions of the area of black pixels (FIGS. 6C and 8D and the other is to determine the location of the page number by comparing the isolated lines of black pixels (FIG. 6E). In both cases, a digit pattern in the selected convex or isolated portion is recognized as the page number of the original image. Since a digit pattern of the page number for each original image may be included in an area of a constant size, a mask 51 sized as shown in FIG. 6C is supposed and placed onto each boundary of the black pixels area in such a way that the boundary line of the area may pass the center of the mask 51. Black pixels included in the mask are then counted. When the mask 51 covers a convex that is similar in size and has a top line laid onto the center line of the mask 51 as shown in FIG. 6D, it may contain a reduced number of black pixels. All boundary portions are checked with the mask 51 and a location (coordinates) at which the least number of black pixels is counted is determined as the center of the convex portion containing the page number.

FIG. 6E illustrates the method for specifying the location of a page number by comparing the sizes of isolated (separate) lines of black pixels. In this case, each line is treated as an isolated block of black pixels, whose boundary (circumferential) length is measured by scanning from one point thereon. This operation is repeated on all isolated blocks. An isolated black block of the least circumferential length is determined as containing the page number.

FIG. 7A to 7C are a view for explaining how to recognize numerals (page number) in the portion determined by the steps of FIG. 6. The page number is recognized digit by digit. An area which substantially corresponds in size to a page number block usually used in a book is evenly divided into 64 (8×8) blocks as shown in FIG. 7A, and a ratio of black pixels' existence in each block is calculated as shown in FIG. 7B. The result of the calculation is compared with the data preliminarily obtained by calculating on typical digit patterns. A numeral whose known digit pattern (as shown in FIG. 7C; right side) mostly correlates with the calculation result is found to be the page number or one element thereof (FIG. 7C).

FIG. 8 to FIG. 12 are flow charts showing the procedure for the processing of FIGS. 6A to 6D.

It is supposed that an image memory 34 and a working memory 36 have, respectively, 3500 pixels in an X-direction and 4800 pixels in a Y-direction (FIG. 6A) and allows for writing therein the image at a resolution of 16 pixels per millimeter. The image data stored in the image memory 34 is copied into the working memory 36 (Step 1 of FIG. 8).

Figure 8:
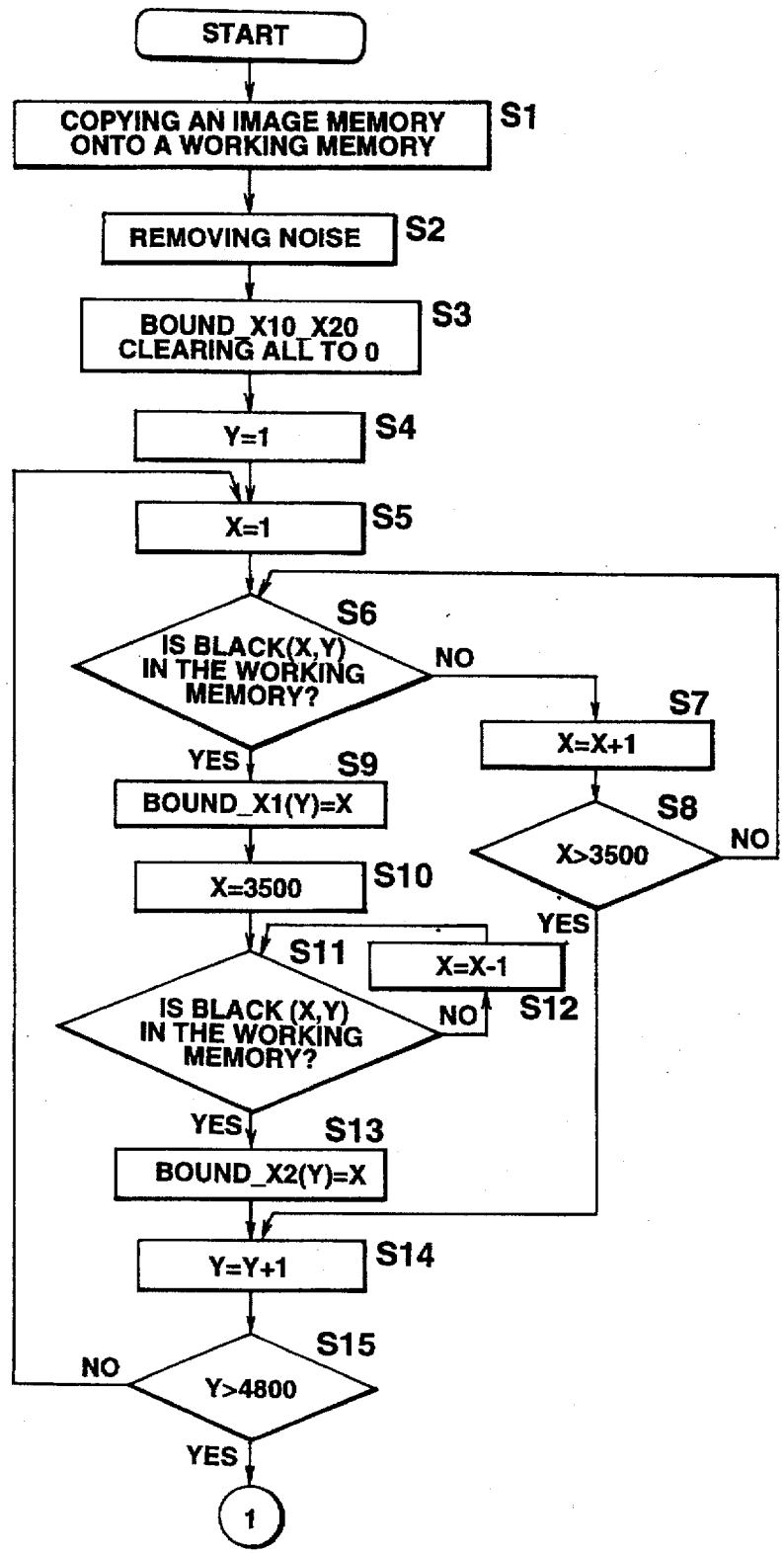
FIG. 8 is a flow chart showing a part of the procedure for recognizing a page number.

In the working memory 36, the smoothing process is performed to remove noises (Step 2 of FIG. 8).

Arrays BOUND_X1 and BOUND_X2 for memorizing the positions of the boundary lines of portions A and B, respectively, of FIG. 6B are all cleared to 0 (Step 3). Arrays BOUND_X1, _X2 have a size of 4800 pixels corresponding to the size of the pixels in the Y-direction. Variables X and Y of the coordinates in the working memory 36 are assumed as 1 (Step 4 and step 5). Image scanning is performed to distinguish the boundary line.

Pixels "X" (starting at X=1) are scanned in the positive direction. A position at which a black pixel was first found is stored in BOUND_X1[Y] (Step 6→Step 9). After X=3500, scanning on pixels X is performed in the negative direction (Step 10 to Step 12) and a position at which a black pixel was first found is stored in BOUND_X2[Y] (Step 13). If no black pixel was detected by scanning from X=1 to X=3500, the scanning in the reverse direction is omitted (Step 6→Step 7→ Step 8→Step 14). The above-described operations are repeated on pixels from Y=1 to Y=4800 (Step 14→Step 15→Step 5).

Figure 9:
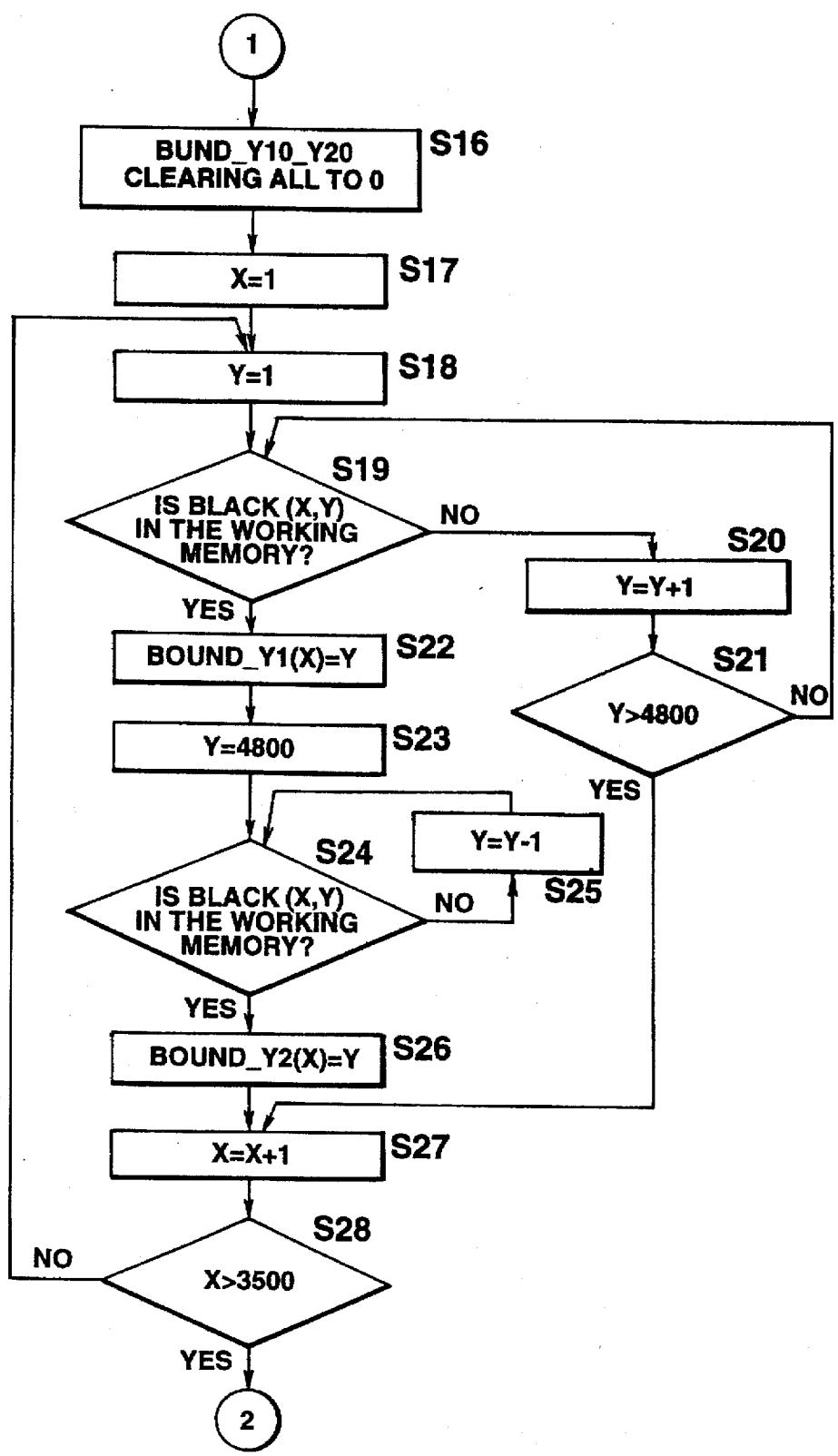
FIG. 9 is a flow chart showing a part of the procedure for recognizing a page number.

Coordinate X is replaced by Y and a similar process is executed on BOUND_Y1[X], BOUND_Y2 [X] (Step 16 to Step 28 of FIG. 9). BOUND_Y1 and BOUND_Y2 are arrays for memorizing positions of boundary lines of portions C and D, respectively, of FIG. 6B. Each array has a size of 3500 pixels corresponding to the size of the pixel in an X-direction.

Figure 10:
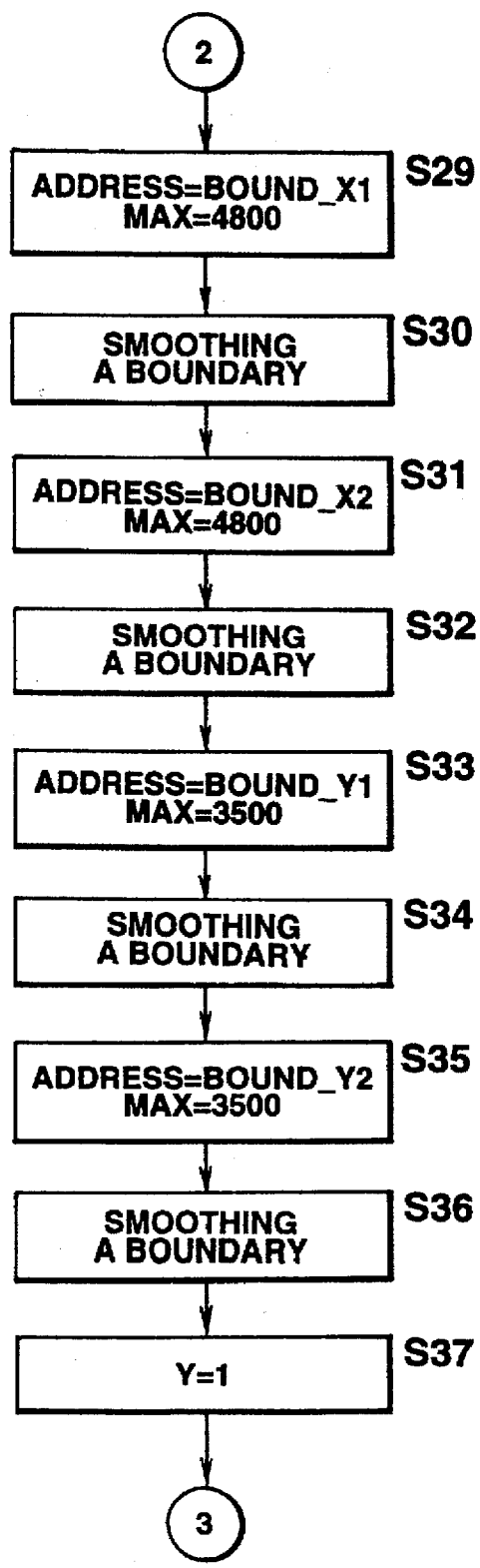
FIG. 10 is a flow chart showing a part of the procedure for recognizing a page number.
Figure 11:
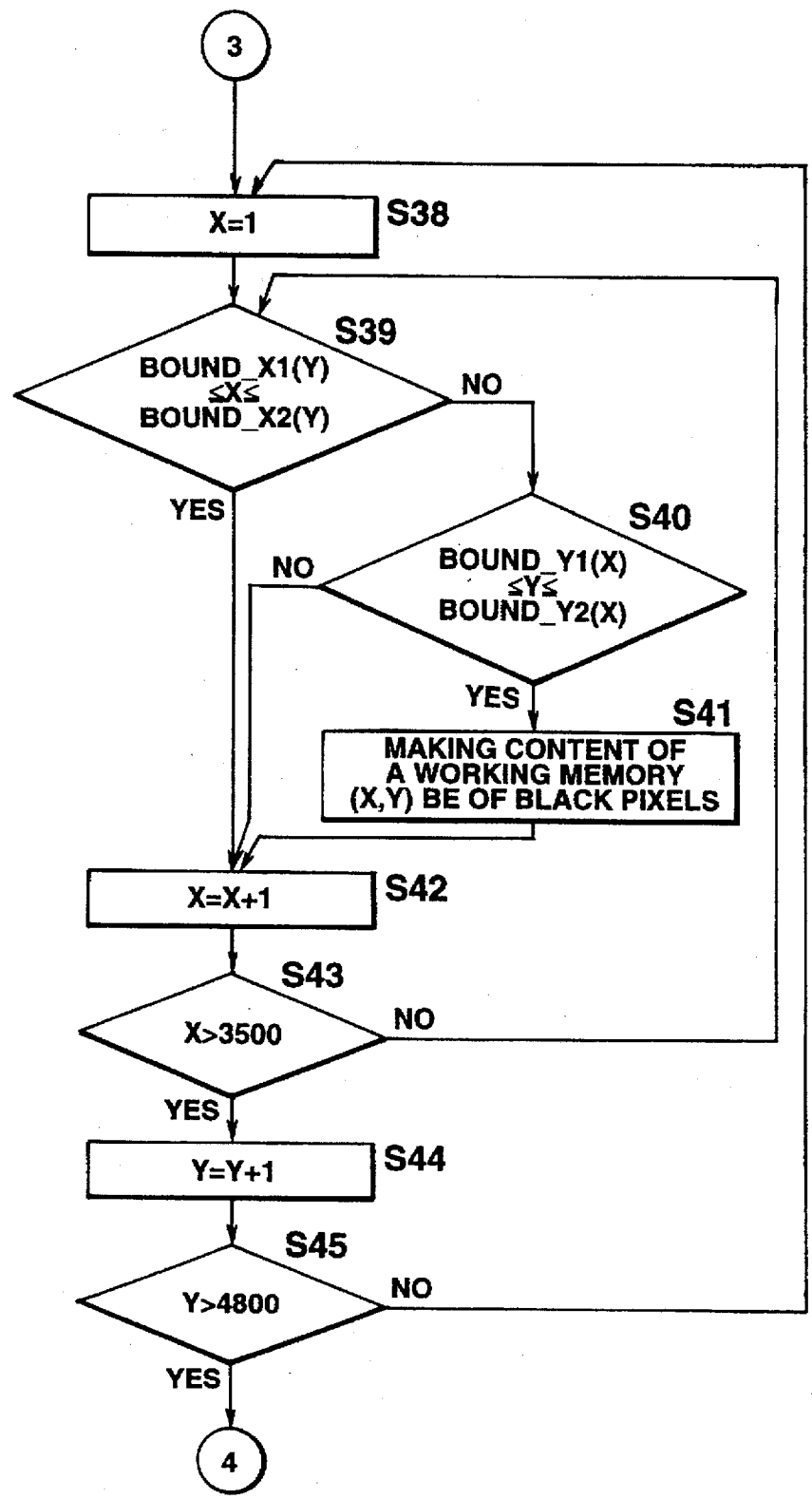
FIG. 11 is a flow chart showing a part of the procedure for recognizing a page number.

To smooth the boundary, mean values of coordinates of a pixel and both neighboring pixels from the values of BOUND_X1[Y] in the range of Y=1 to Y=4800 are calculated and returned to BOUND_X1[Y] (Step 29 and Step 30 of FIG. 10). Similar processing is carried out on BOUND_Y2, _Y1, _Y2 (Step 31 to Step 36).

Figure 13:
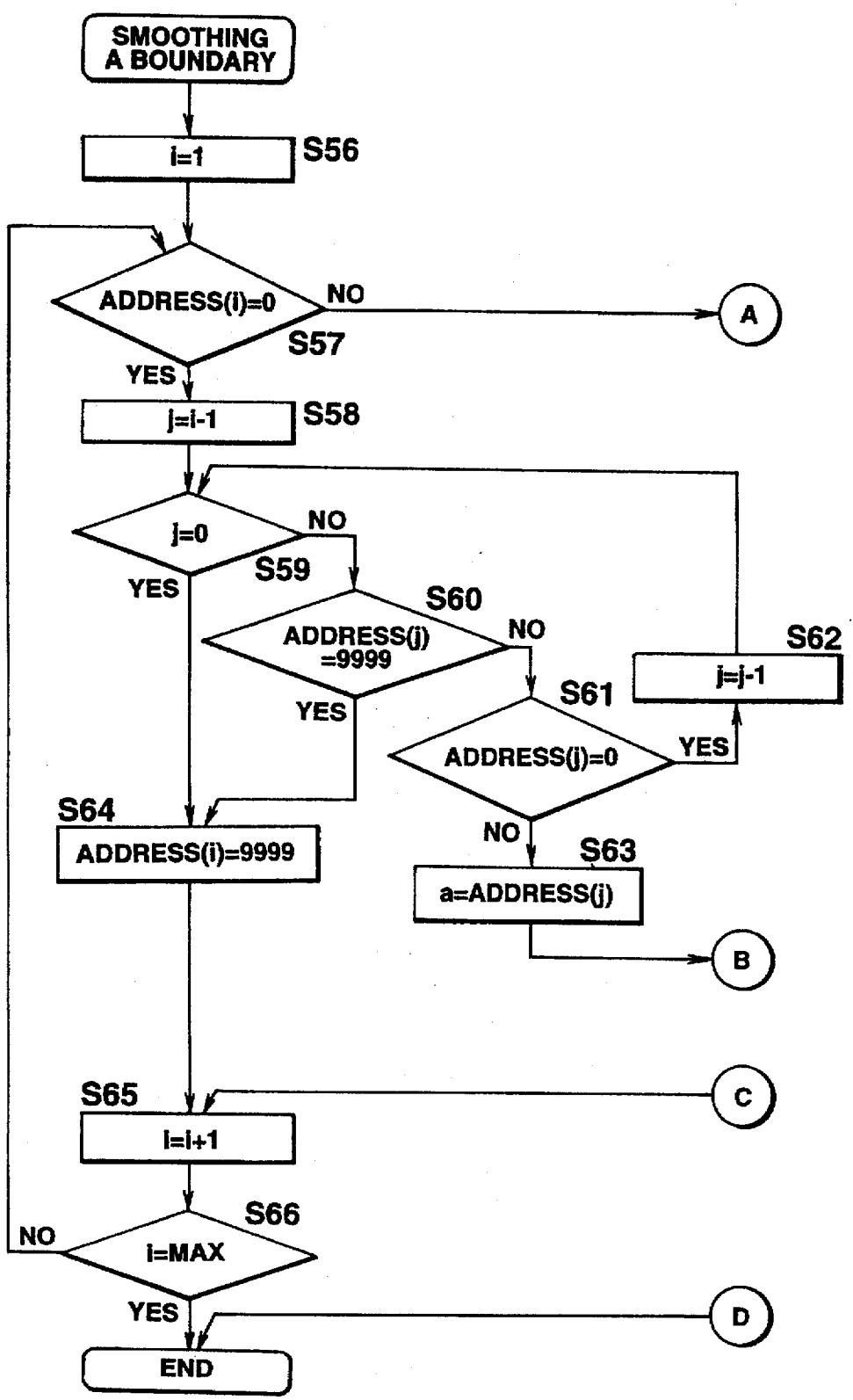
FIG. 13 is a flow chart showing a part of the procedure for boundary smoothing.
Figure 14:
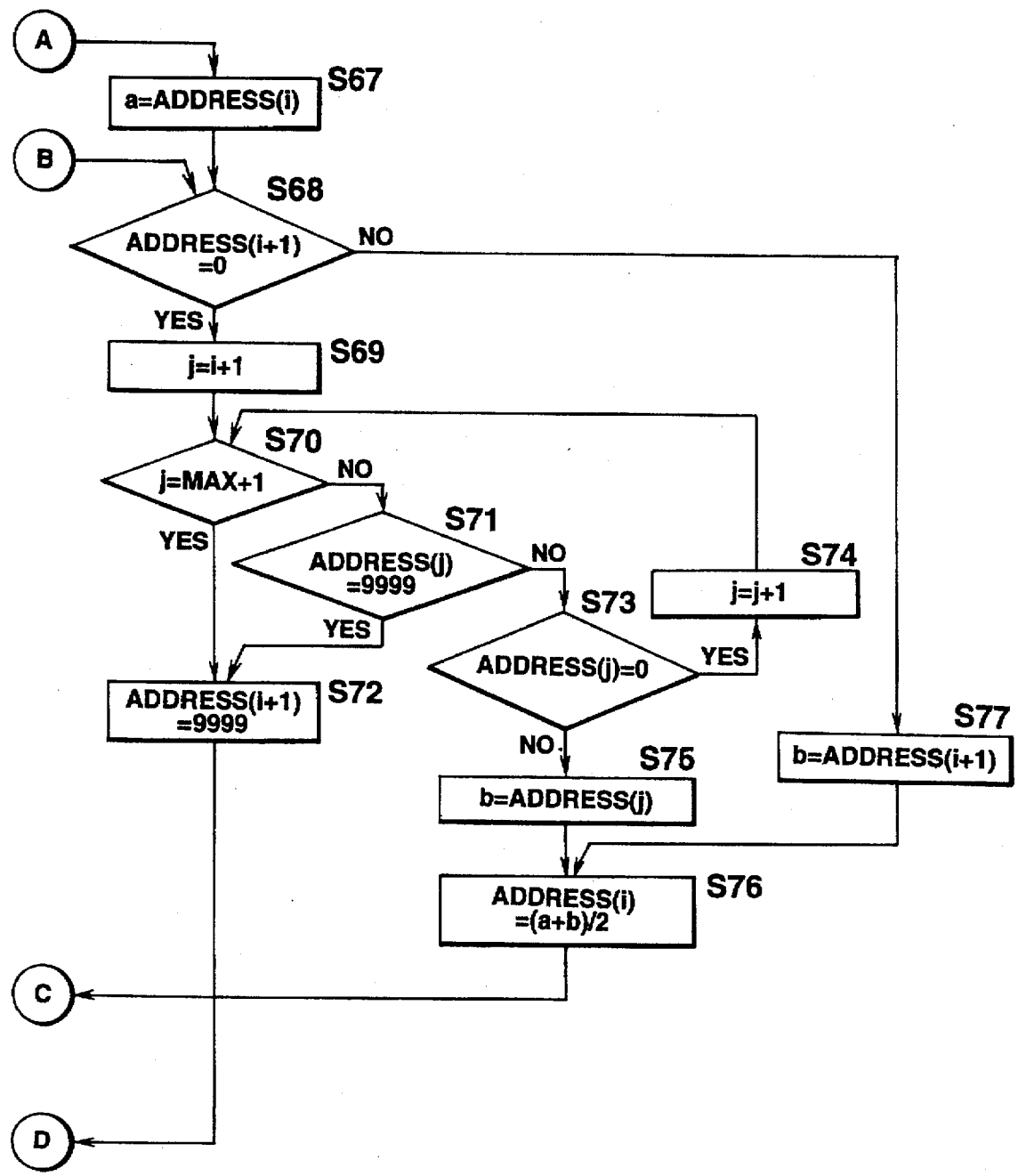
FIG. 14 is a flow chart showing a part of the procedure for boundary smoothing.

FIGS. 13 and 14 are flow charts for explaining a smoothing procedure commonly applied to BOUND_X1, _X2, _Y1, _Y2 (to be referred to by addresses). Basically, an arithmetical mean is calculated from the coordinate values of a currently remarked position and a position shifted by 1 pixel in the positive direction.

A variable "i" representing a currently remarked (unidimentional) coordinate is initialized (Step 56 of FIG. 13) and ADDRESS[i] is checked. Since ADDRESS[i] is 0 for a line in which no black pixel is detected (Step 57 to Step 58), a coordinate being not equal to 0 is searched for in the negative direction from the remarked coordinate (Step 58 to Step 62, Step 63).

Since scanning in the negative direction from the end of the pixels cannot detect a point having the coordinate ≠0, a value 9999 indicating "out of bounds" is set in ADDRESS[i] (Step 60→Step 64).

Since a point having the coordinate ≠0 cannot be detected by further scanning when ADDRESS[i] is 9999, a value 9999 is placed therein (Step 60→Step 64).

When ADDRESS[i] is ≠0 from the first (Step 57) and when a point of coordinate ≠0 is detected by scanning in the negative direction (Step 63→Step 67), the respective values are stored in the place "a".

Substantially the same procedure is carried out on the threshold of the next coordinate. In this case, however, scanning is performed in the positive direction when a remarked pixel is at 0 (Step 68 to Step 69 of FIG. 14). When scanning reaches the end of the boundary or the preset end mark (=9999), the end mark is set (Step 70, Step 71→Step 72). When the point has a coordinate ≠0 is determined, said coordinate value is set in the place "b" and the mean value is calculated (Step 77, Step 75→Step 76). The above-mentioned procedure is repeated until "i" becomes the maximal value.

To replace pixels in a region defined by BOUND_X1,_X2, _Y1,_Y2 with black pixels, each pixel (X, Y) is converted into black on condition that coordinate (X, Y) is:
BOUND_X1[Y]≦X≦BOUND_X2[Y] and
BOUND_Y1[X]≦Y≦BOUND_Y2[X]
(Step 39 to Step 41 of FIG. 11).

The above-mentioned process is executed on all coordinates(Step 37 to Step 45). Consequently, all pixels within the boundary of an area of black pixels are replaced with black pixels and the boundary coordinates are written in the BOUND_X1, _X2, _Y1, _Y2.

Figure 12:
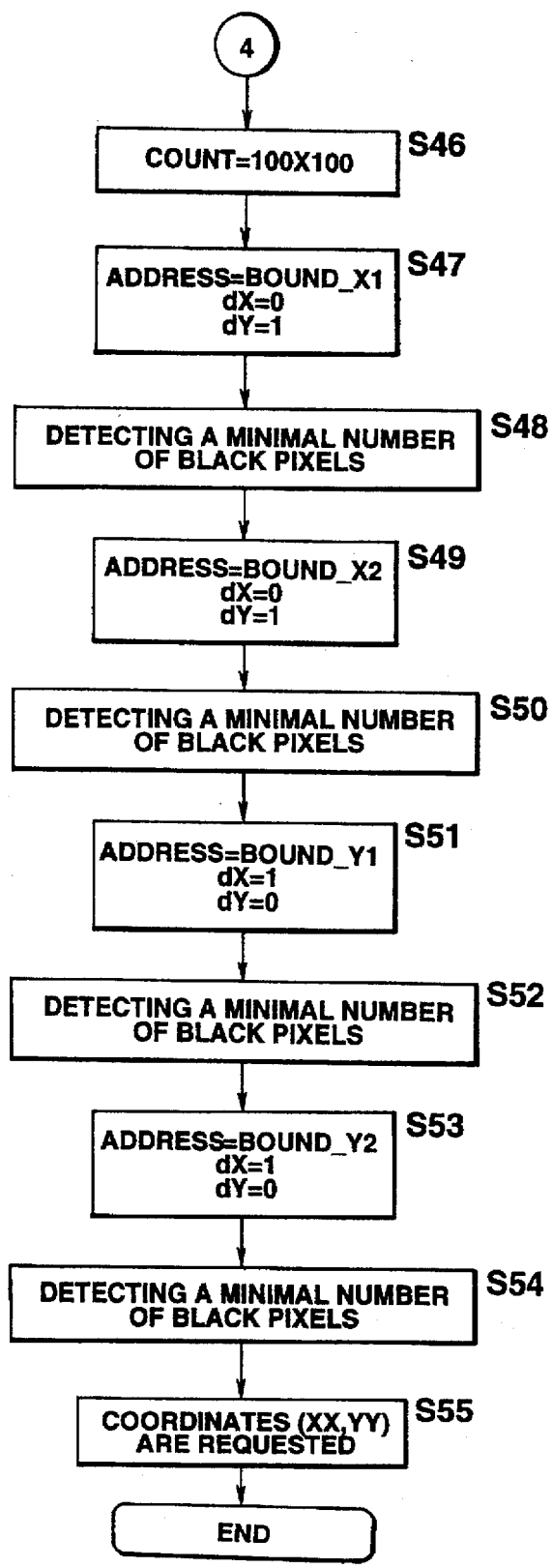
FIG. 12 is a flow chart showing a part of the procedure for recognizing a page number.

The page number is assumed to be of 100×100 pixels in size (Step 46 of FIG. 12). Processing is carried out by placing a mask of 100×100 pixels in size on each boundary portion and by counting black pixels contained therein (Step 47 to Step 54 of FIG. 12). The countable value is preset at a maximal value (=100×100) (Step 46 of FIG. 12). The coordinate of a page number is determined as that of a convex portion in which a minimal number of black pixels is counted (Step 55 of FIG. 12).

Figure 15:
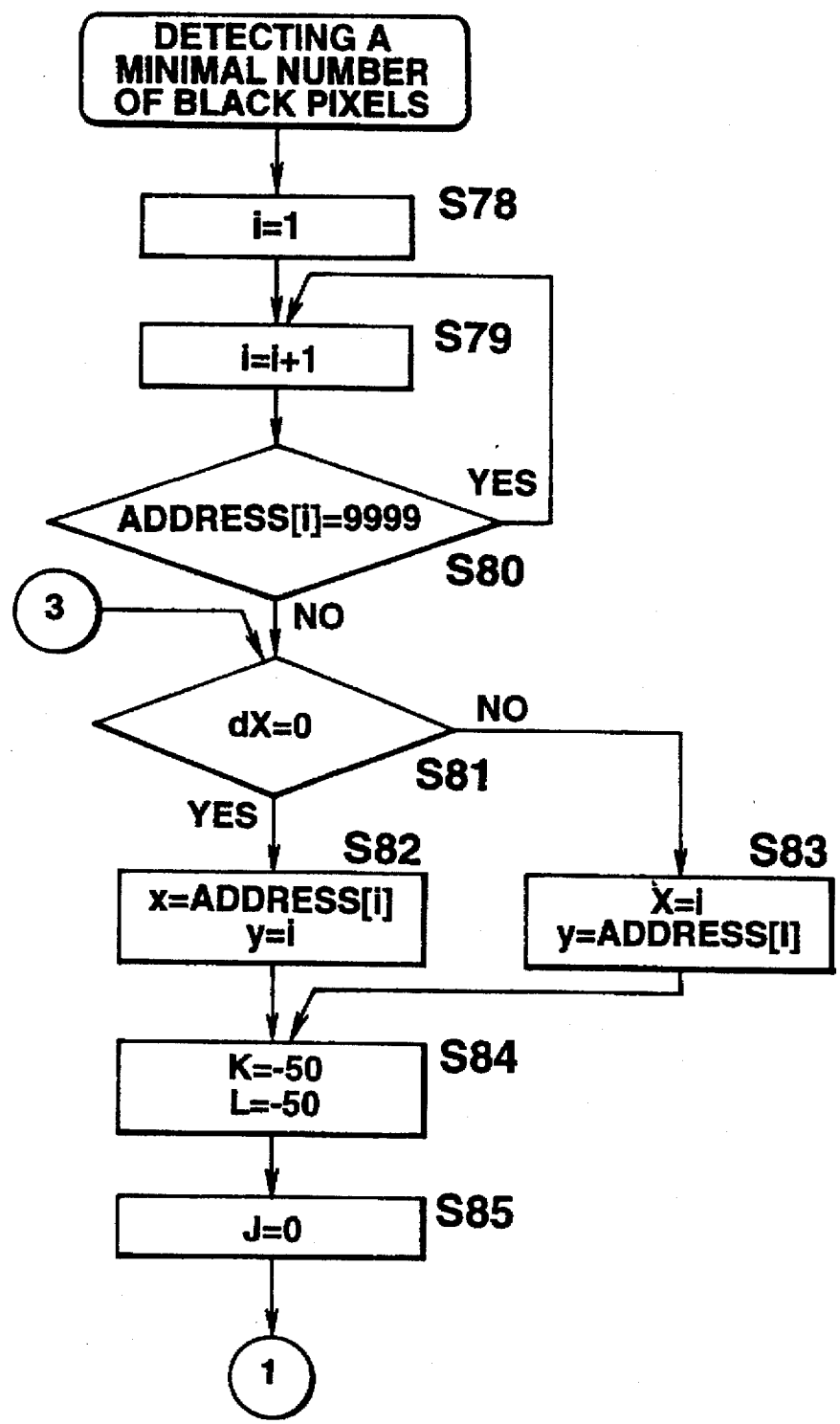
FIG. 15 is a flow chart showing a part of the procedure for detecting a minimal value of black pixels.
Figure 16:
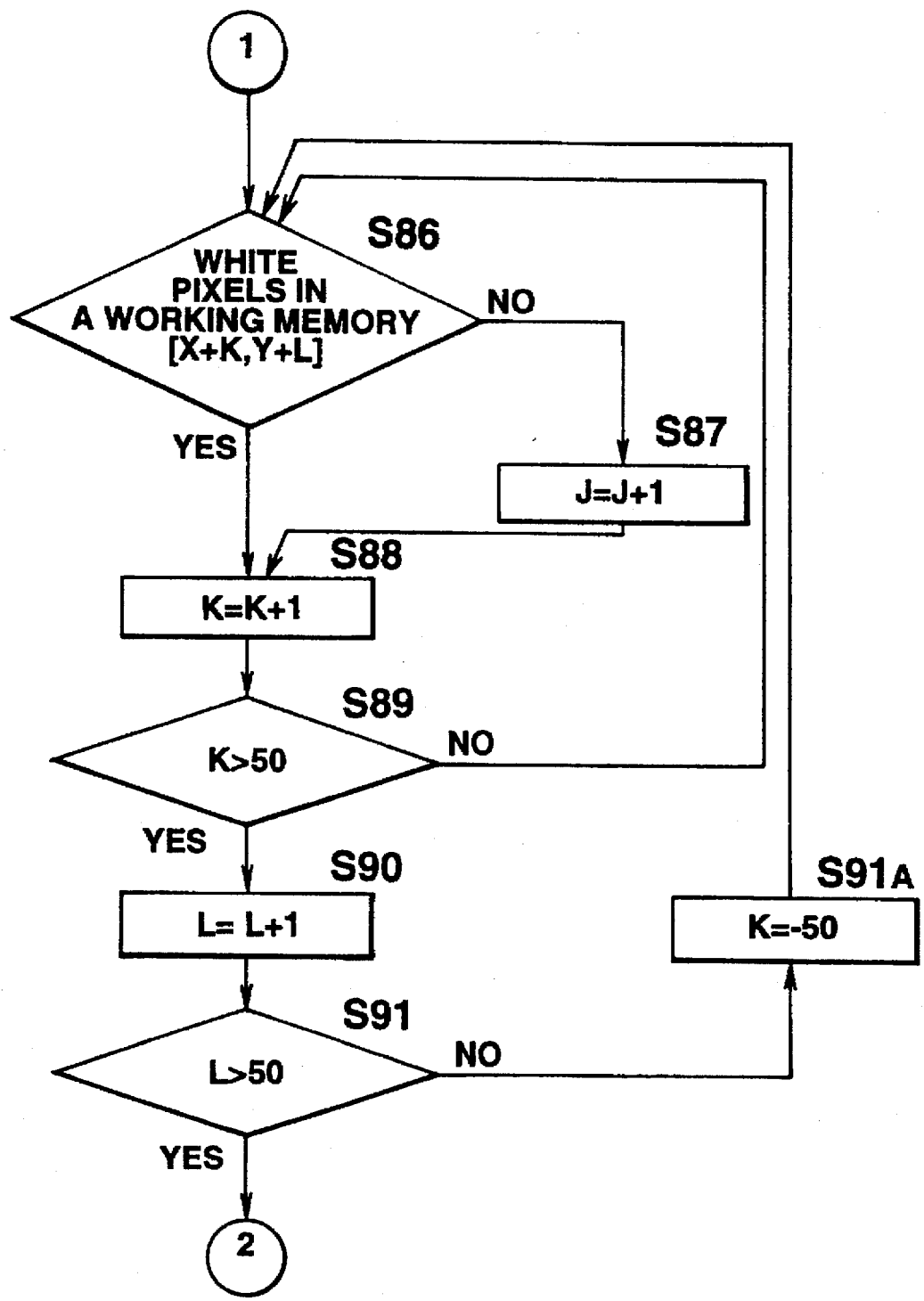
FIG. 16 is a flow chart showing a part of the procedure for detecting a minimal value of black pixels.
Figure 17:
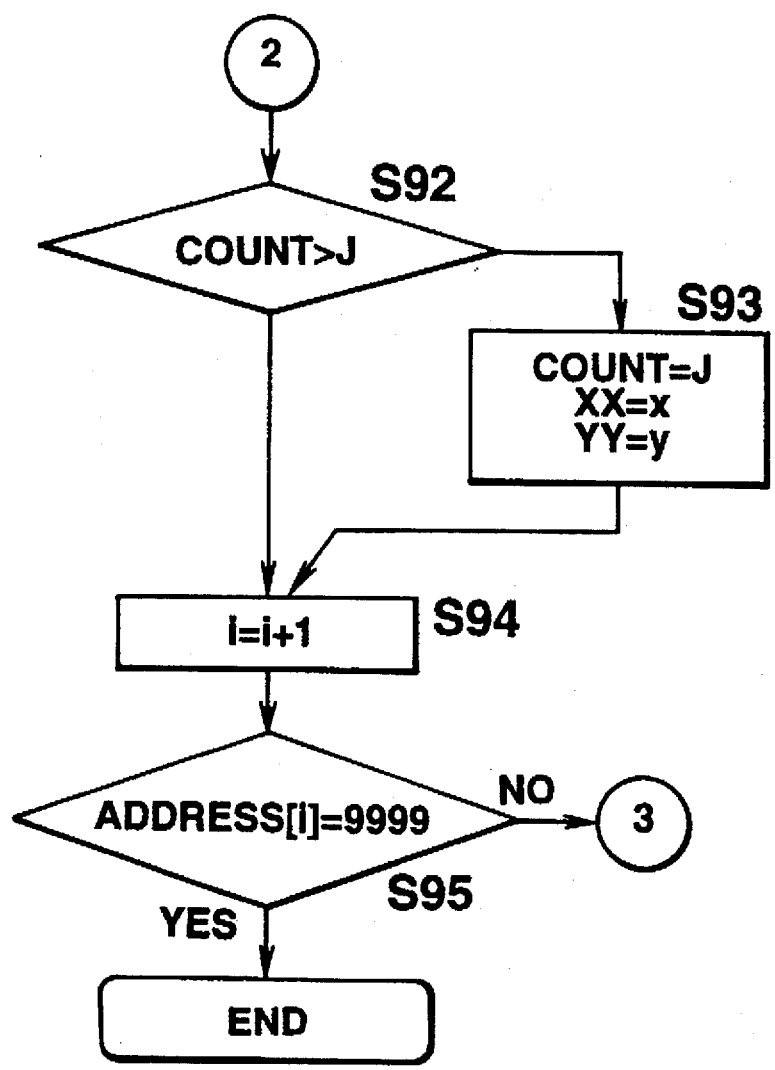
FIG. 17 is a flow chart showing a part of the procedure for detecting a minimal value of black pixels.

FIGS. 15 to 17 commonly illustrate the procedure for processing the detection of the least number of black pixels for the arrays BOUND_X1 to BOUND_Y2.

As shown in FIGS. 13 and 14, a numeral code 9999 is set at the end portion of BOUND_. The portion having ADDRESS[i]≠9999 is searched (Step 80 of FIG. 15).

In case of dX=0 the image memory has a coordinate system in which ADDRESS[i] is the abscissa (x-axis) and i is the ordinate (y-axis), while in the case of dX≠0 it has a coordinate system in which ADDRESS[i] is the ordinate (y-axis) and i is the abscissa (x-axis) (Step 81 to Step 83 of FIG. 15).

In the working memory, the number of black pixels in a range of ±50 pixels with reference to the above-mentioned coordinates is counted (Step 84 to Step 91 of FIGS. 15 and 16). Character J denotes a counter.

When the number of counted black pixels is smaller than the value preset in COUNT, the number is set in the COUNT and at the same time the coordinates are set in XX and YY (Step 93 of FIG. 17).

The above-mentioned procedure is repeated until the end mark 9999 is sensed (Step 95 of FIG. 17→Step 81 of FIG. 15).

Figure 18:
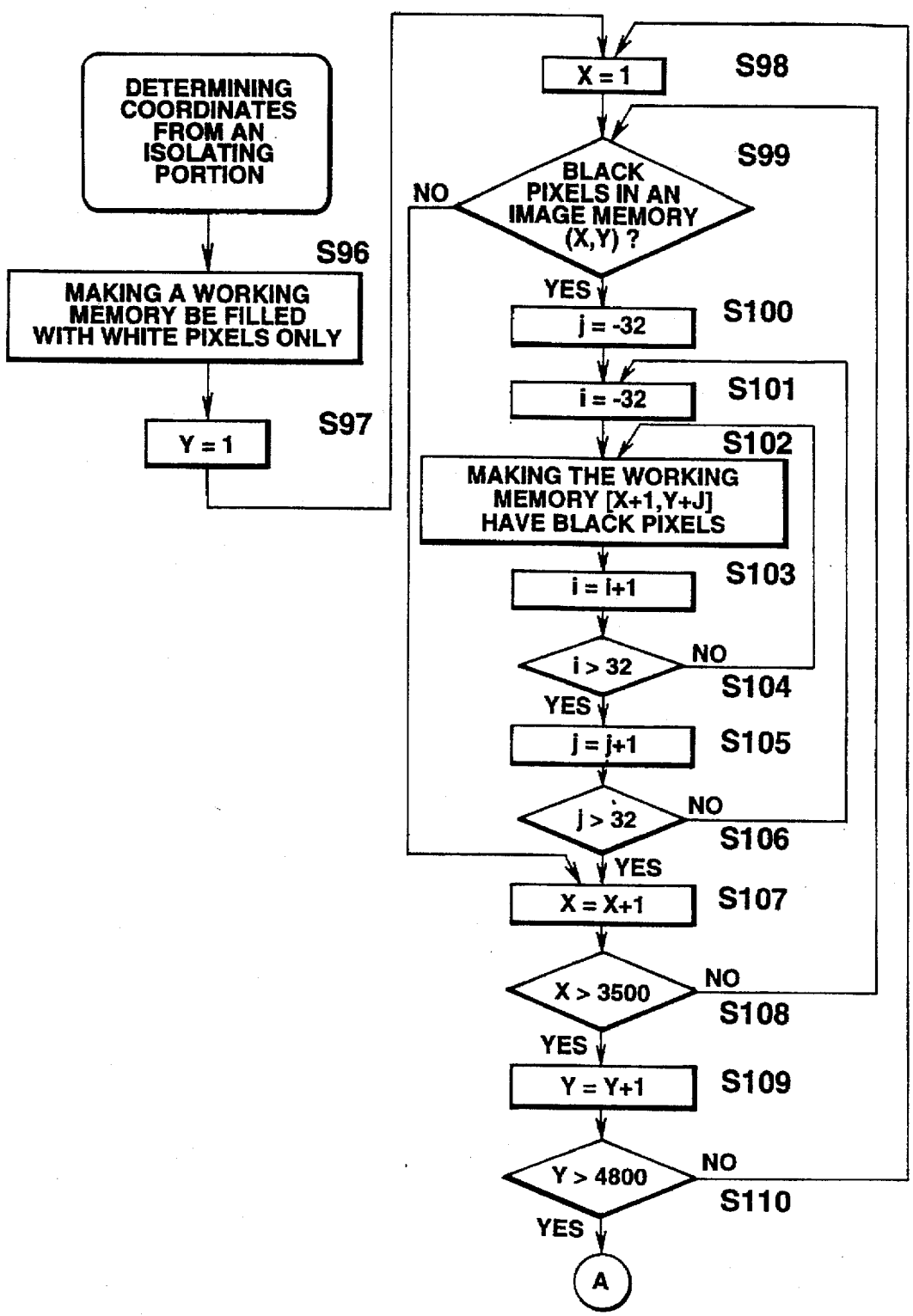
FIG. 18 is a flow chart showing a part of the procedure for determining the position of a page number according to an isolated Portion of black pixels.
Figure 19:
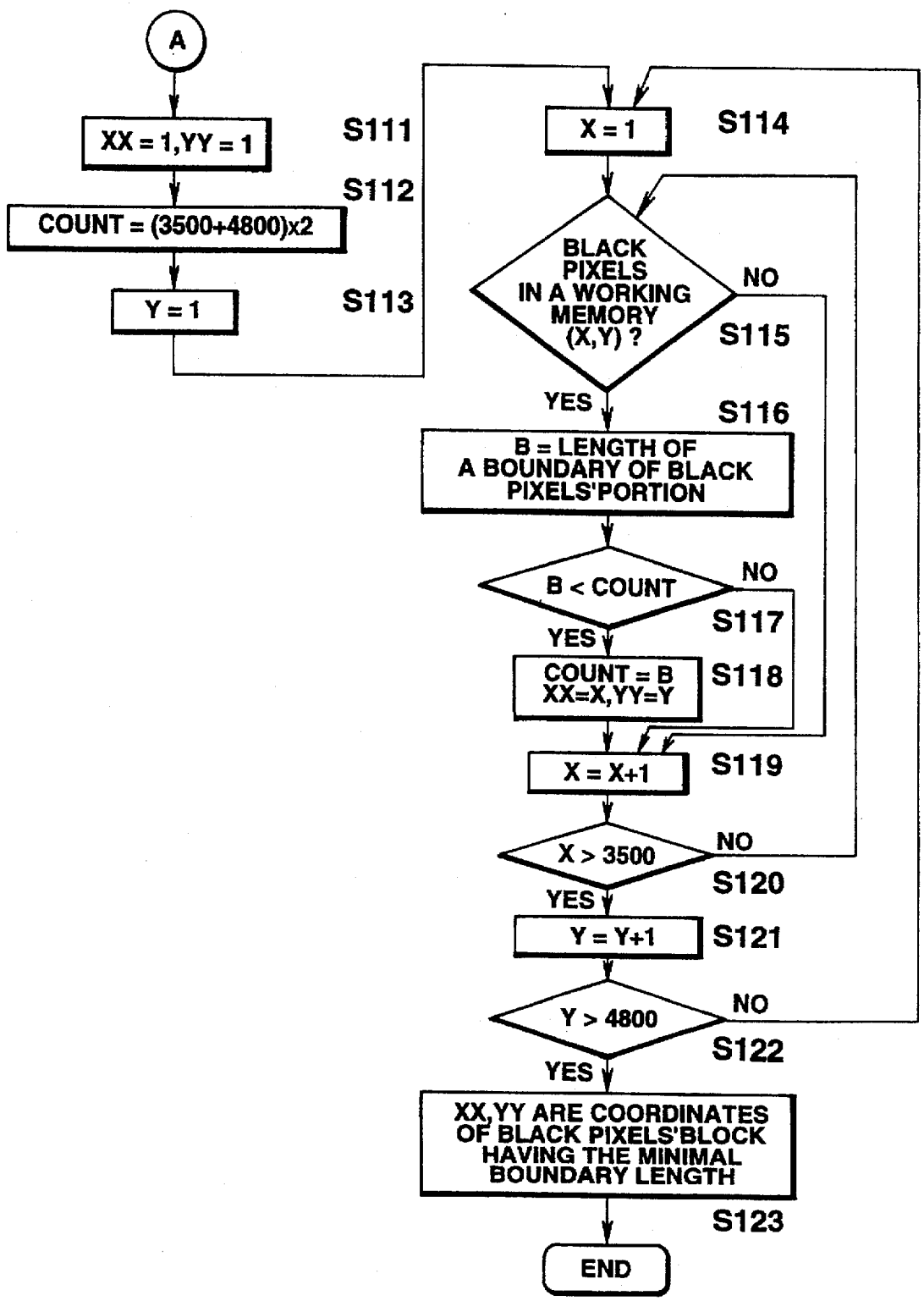
FIG. 19 is a flow chart showing a part of the procedure for determining the position of a page number according to an isolated portion of black pixels.

FIGS. 18 and 19 are flow charts showing the procedure for determining the location of a page number among the isolated blocks of black pixels of the image shown in FIG. 6E.

The working memory is all cleared in order to to have white pixels (Step 96 of FIG. 18).

When a certain pixel in the image memory is black (Step 99 to Step 100), a pixel having corresponding coordinates and 32 pixels, existing therein in the working memory, are converted into black pixels (Step 100 to Step 106), thereby the black pixel image corresponding to initially the black pixels portion in the image memory expands to be 2 mm in radius and the relatively nearby black pixels join with each other to form a separate black block. The above-mentioned procedure is repeated for every coordinate (Step 107, Step 108→Step 99 and Step 109, Step 110→Step 98).

After completion of the above-mentioned process, the circumferential length of each separate block of black pixels will be carried out. For this, a counter COUNT for counting a least circumferential length of a black pixels' block is set first at a circumferential length of all the image's region and the memory of coordinates (XX, YY) for memorizing coordinates of the block having the least circumferential length is initialized at (1,1) (Step 111 and Step 112 of FIG. 19).

Figure 20:
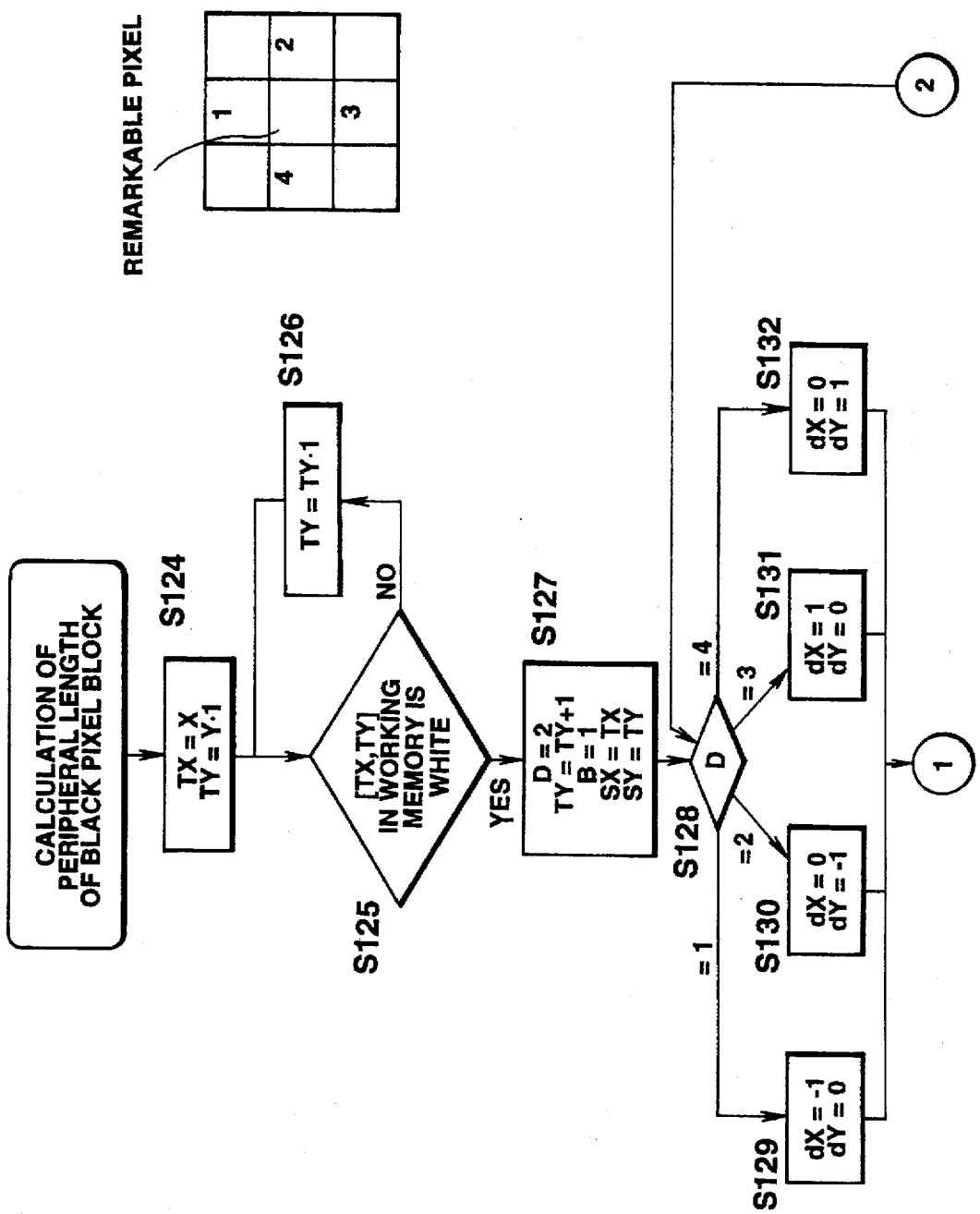
FIG. 20 is a flow chart showing a part of the procedure for determining the peripheral length of a black pixel portion, including a certain point of coordinates.
Figure 21:
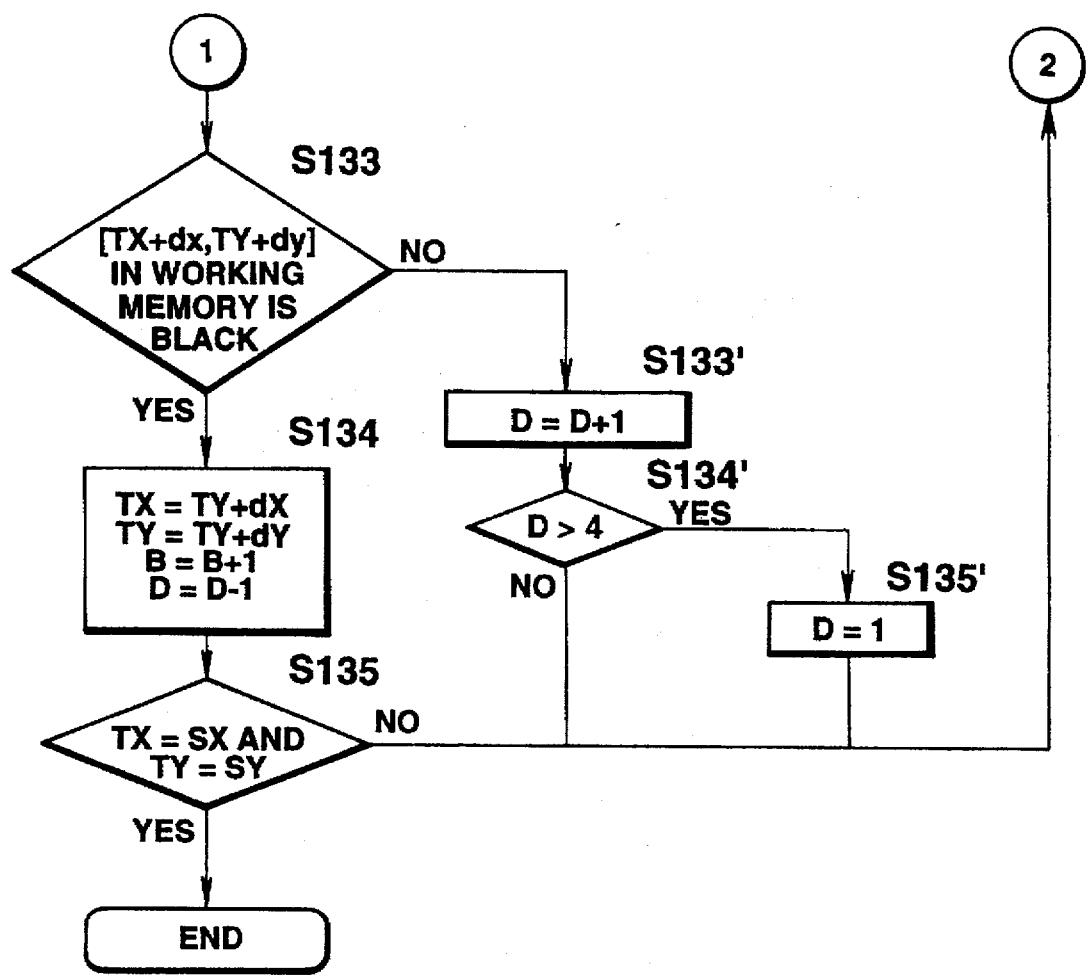
FIG. 21 is a flow chart showing a part of the procedure for determining the peripheral length of black pixels portion including a certain point of coordinates.

When a block defined by coordinates XX,YY in the working memory is of black pixels, its circumferential length is calculated according to a procedure shown in FIGS. 20 and 21 and the result is stored in the place B (Step 116 of FIG. 19).

If B<COUNT, the block is currently less and its circumferential length and coordinates are held (Step 117 to Step 118).

The above-mentioned process is performed for all separate blocks of black pixels, thereby the coordinate values of the black pixels' block of least circumferential length is set in the memory region XX, YY (Step 123 of FIG. 19).

FIGS. 20 and 21 are flow charts for explaining the procedure for determining the circumferential length of a black pixels' block including a certain point having the coordinates (X, Y) in an image. The image is scanned from the point (X, Y) in the negative direction of the y-axis until the coordinates of a first white pixel is detected (Step 124 to Step 126 of FIG. 20). The coordinates of a point directly before the detected point coordinates are set in TX, TY, SX, SY. At the same time, a value D is set at 2 and the value B for counting a circumferential length is set at 1 (Step 127 of FIG. 20).

Character D denotes the direction of scanning to be specified from a remarkable pixel by setting one of the numerals 1, 2, 3 and 4 (i.e., one of four directions) as shown in FIG. 20.

The necessary scanning direction D is determined (Step 128→Step 129 Step 130, Step 131, Step 132 of FIG. 20).

An adjacent black pixel is determined when the work memory is black at a point (TX+dX, TY+dY) (Step 133 to Step 134 of FIG. 21). TX and TY are shifted in the some direction. At the same time, the circumferential length count is increased by +1 and D is set at −1 for further scanning. When a white pixel is detected (Step 133 to Step 133 ), D is set at +1 and scanning is performed again. In this case, D is returned to 1 if D>4 (Step 134'and Step 135').

The above-mentioned procedure is repeated until TX becomes equal to SY and TY becomes equal to SY. A count number indicating a block's circumferential length is set in B.

To simplify the explanation, in the shown case the processing is performed on all pixels, but it is also possible to mask pixels containing a block whose boundary was counted to avoid double counting, thereby the processing may be more effectively conducted.

Figure 22:
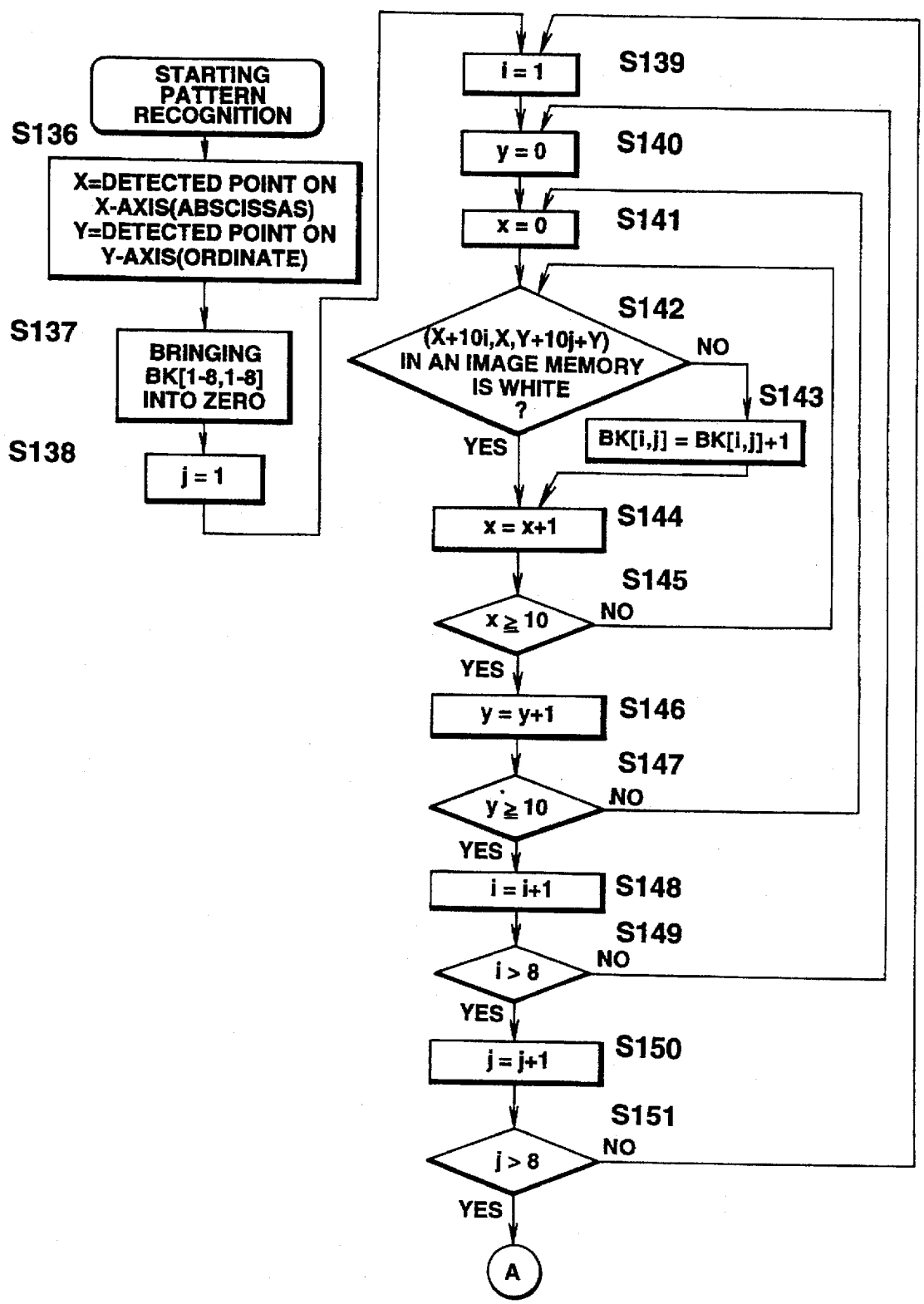
FIG. 22 is a flow chart showing a part of the procedure for processing one digit of a page number by a page number recognizing method.
Figure 23:
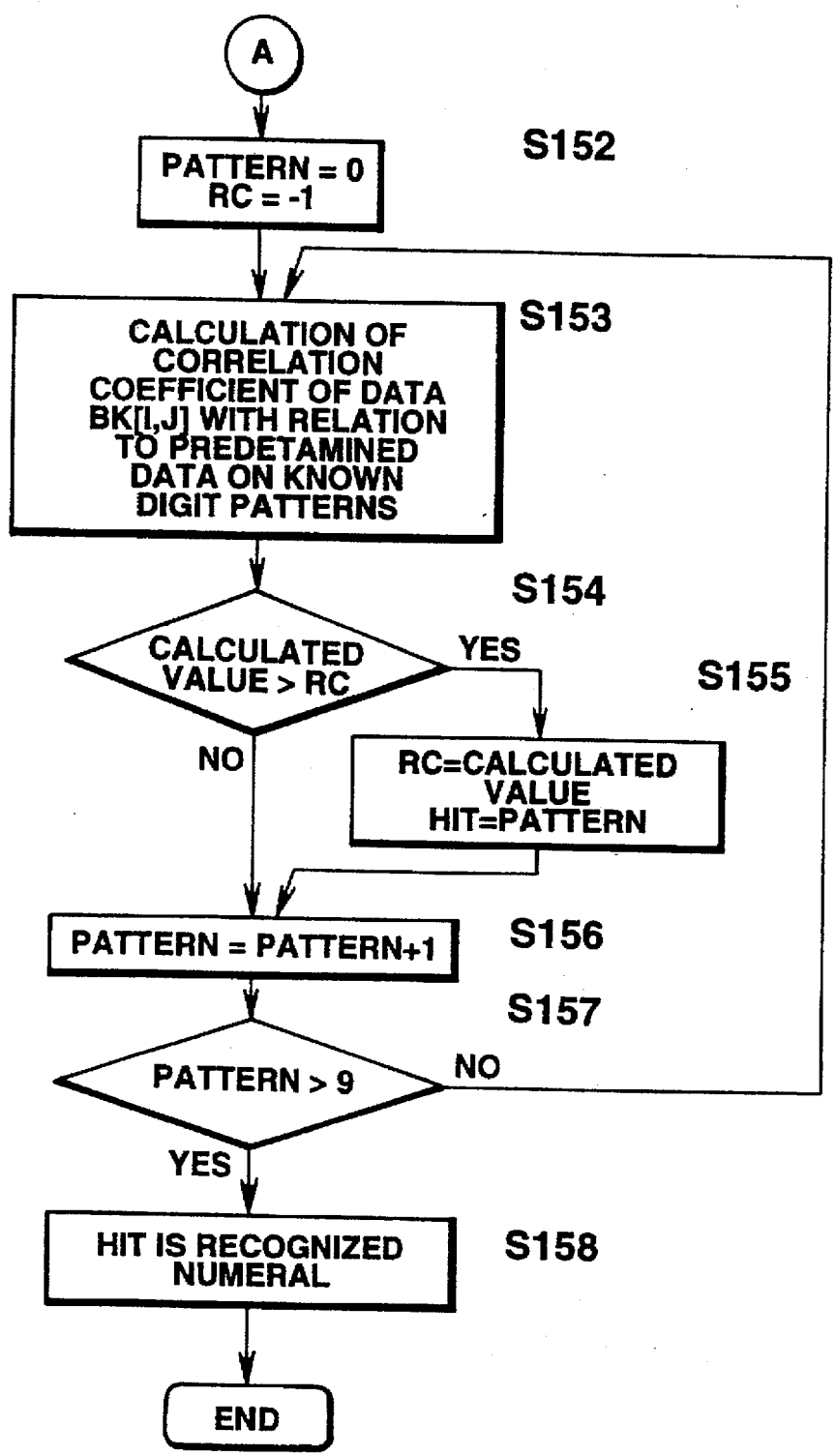
FIG. 23 is a flow chart showing a part of the procedure for processing one digit of a page number by a page number recognizing method.

FIGS. 22 and 23 are flow charts indicating how to process one numeral in the procedure shown in FIG. 7.

64 (8×8) blocks each consisting of 10×10 pixels are assumed on the image data which is specified by the coordinates X, Y as defined by the processing shown in FIGS. 8 to 17 or FIGS. 8 to 20 (Step 137 of FIG. 22). The number of black pixels in each block (10×10 pixels) is counted (Step 140 to 147). 64 (8×8) blocks are processed at Steps 138 to Step 139 and Step 148 to Step 151.

The obtained data is compared with the counted data of each digit pattern previously prepared by a similar method for determining the coefficient of the correlation therebetween (Step 153 of FIG. 23).

The patterns of numerals 0-10 are successively changed and compared with the obtained data (Step 152 to Step 157 of FIG. 23), and the mostly correlated numeral is selected as a page number or a digit thereof (Step 158).

In practice, a page number may be composed of plural digits. Accordingly, the above-mentioned block is displaced by a specified distance and the same process is repeated thereat to determine the next numeral. A plurality of known numerals, which digit patterns are mostly correlated with the obtained data, is determined as a page number. To increase the accuracy of the page number recognition, it is also possible to perform the recognizing operations on a plurality of portions (coordinates) if a portion first recognized as containing a page number was proved to have a poor correlation with the known digit patterns.

Figure 24:
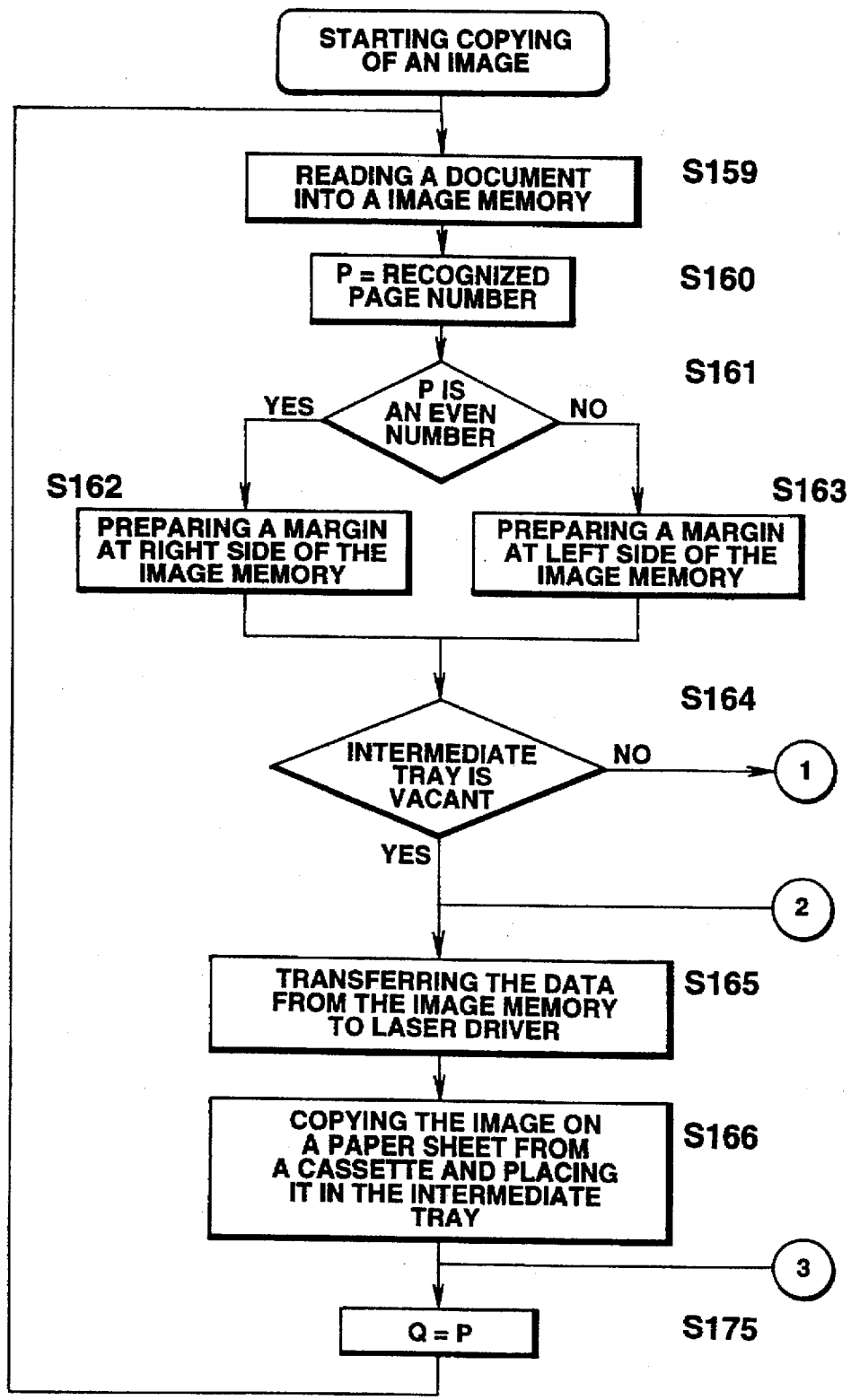
FIG. 24 is a flow chart showing a part of an explanation on operations (for controlling a binding margin and the top and reverse sides of a sheet of paper to be printed on (both sides) of the present invention as defined in claims 1 and 2.
Figure 25:
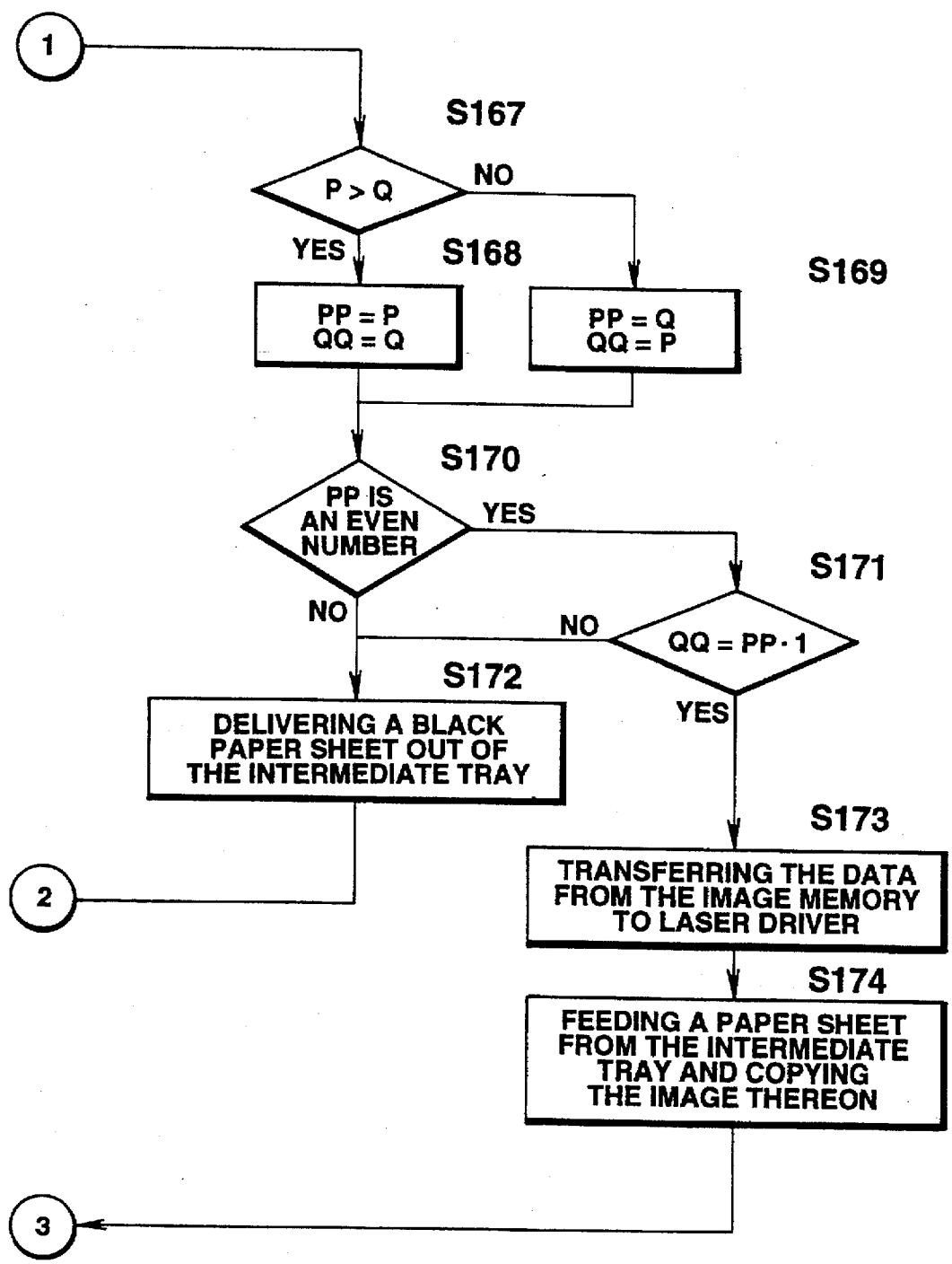
FIG. 25 is a flow chart showing a part of an explanation on operations (for controlling a binding margin and front and back sides of paper to be printed on (both sides) of the present invention, as defined in claims 1 and 2.

FIGS. 24 and 25 are flow charts for explaining the methods in claims 1 and 2 for providing a binding margin and for specifying both-sided or one-sided copying on an initial sheet of paper when copying paged originals, e.g. the pages of a book on both sides of the paper. In this case, originals printed from left to right will be copied.

Usually, the spread of a book has an even page number on a left leaf and an odd page number on a right leaf. Accordingly, a binding margin may be provided at the right hand side from the original image of the odd-numbered page and at the left hand side from the original image of the even numbered page. For a similar reason, the page (2n−1) and the page (2n) ("n" is a certain integer) of an original (pages of a book) shall be copied onto the front side and the back side of a sheet of paper.

An original copy is scanned and its image data is placed into an image memory 34 (Step 159 of FIG. 24). The page number recognizing unit executes the processing operations shown in FIGS. 6 through 21 to recognize a page number. The recognized page number is stored in the place P (Step 160 of FIG. 24). When the image is an even-numbered page (or odd-numbered page), the right side margin (or the left side margin) of the image memory is replaced with white pixels of about 20 mm in width (Step 161 to Step 163).

When an intermediate tray is vacant, the image data is copied onto a sheet of paper fed from a paper cassette and the sheet is then sent to the intermediate tray and temporarily held therein (Step 164 to Step 166 of FIG. 24).

When the intermediate tray is occupied, a larger one P or Q is inserted in PP and a smaller one P or Q is inserted in QQ (Steps 167, 168, 169 of FIGS. 24 and 25).

When PP is an odd number, a right-hand side page of a spread of the book and a precedin g thereto page are stored in the image memory or the intermediate tray. Both images cannot be copied on both sides of the same sheet therefore the sheet of paper, temporarily stored in the intermediate tray, is delivered without being printed (Step 170→Step 172 of FIG. 25).

When PP is an even number and QQ is less than PP by one, both images are copied on both sides of the same sheet. Therefore, the image data from the image memory is transferred to a laser driver and copied on the blank side of the sheet fed from the intermediate tray (Step 170→Step 171→Steps 173, 174 of FIG. 25).

When the relationship of step 171 is not satisfied, i.e., QQ is not equal to PP-1, both pages are not successive to each other and the sheet in the copying intermediate tray is delivered out of the machine (Step 171 to Steps 172 of FIG. 25).

After the sheet from the intermediate tray is delivered out of the copying machine, a new sheet is fed from the paper cassette, printed and stored in the intermediate tray.

Q is stored in P and processed for the next copying process.

Figure 26:
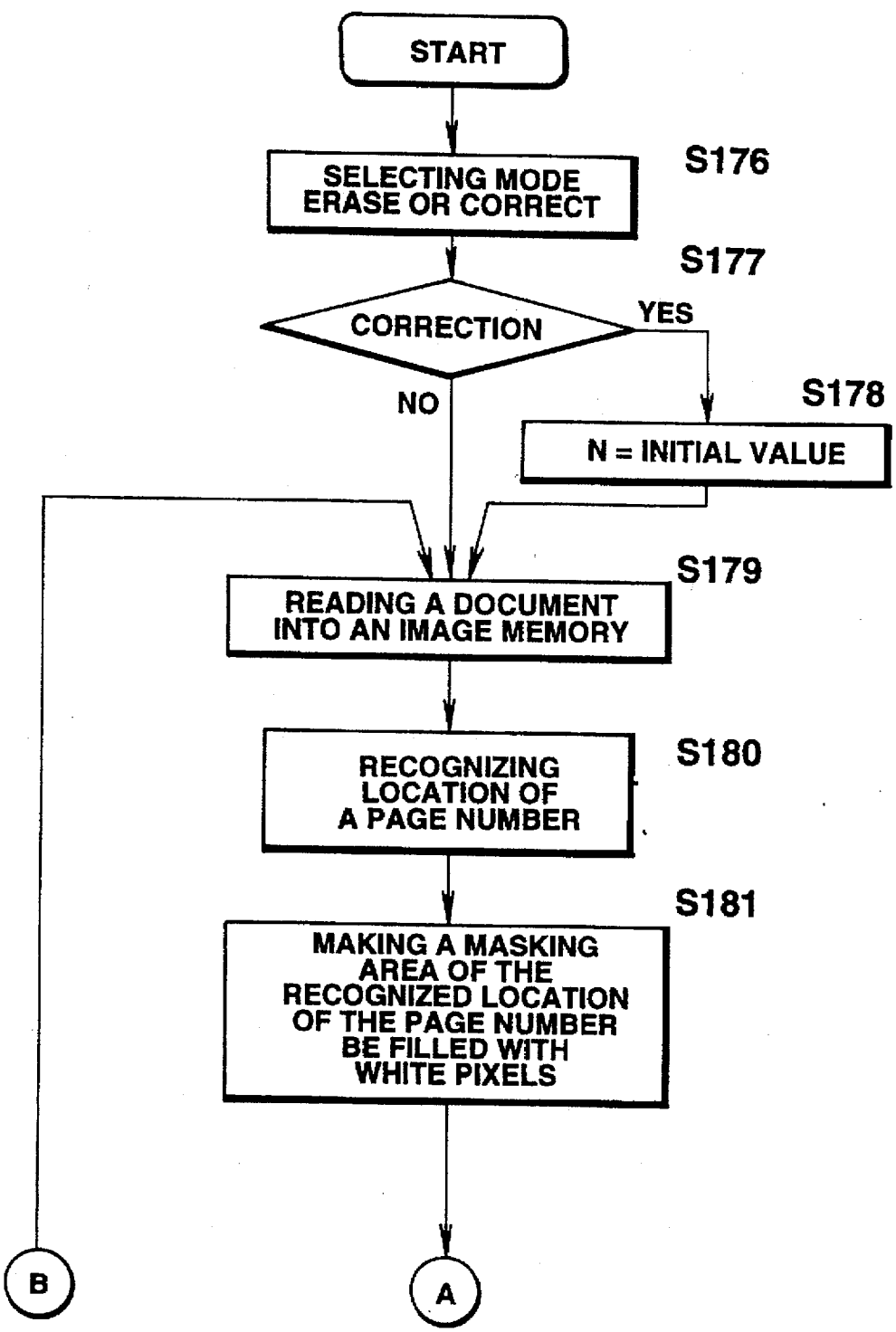
FIG. 26 is a flow chart showing a part of an explanation on operations (for erasing or replacing a page number) of the present invention as defined in claim 3.
Figure 27:
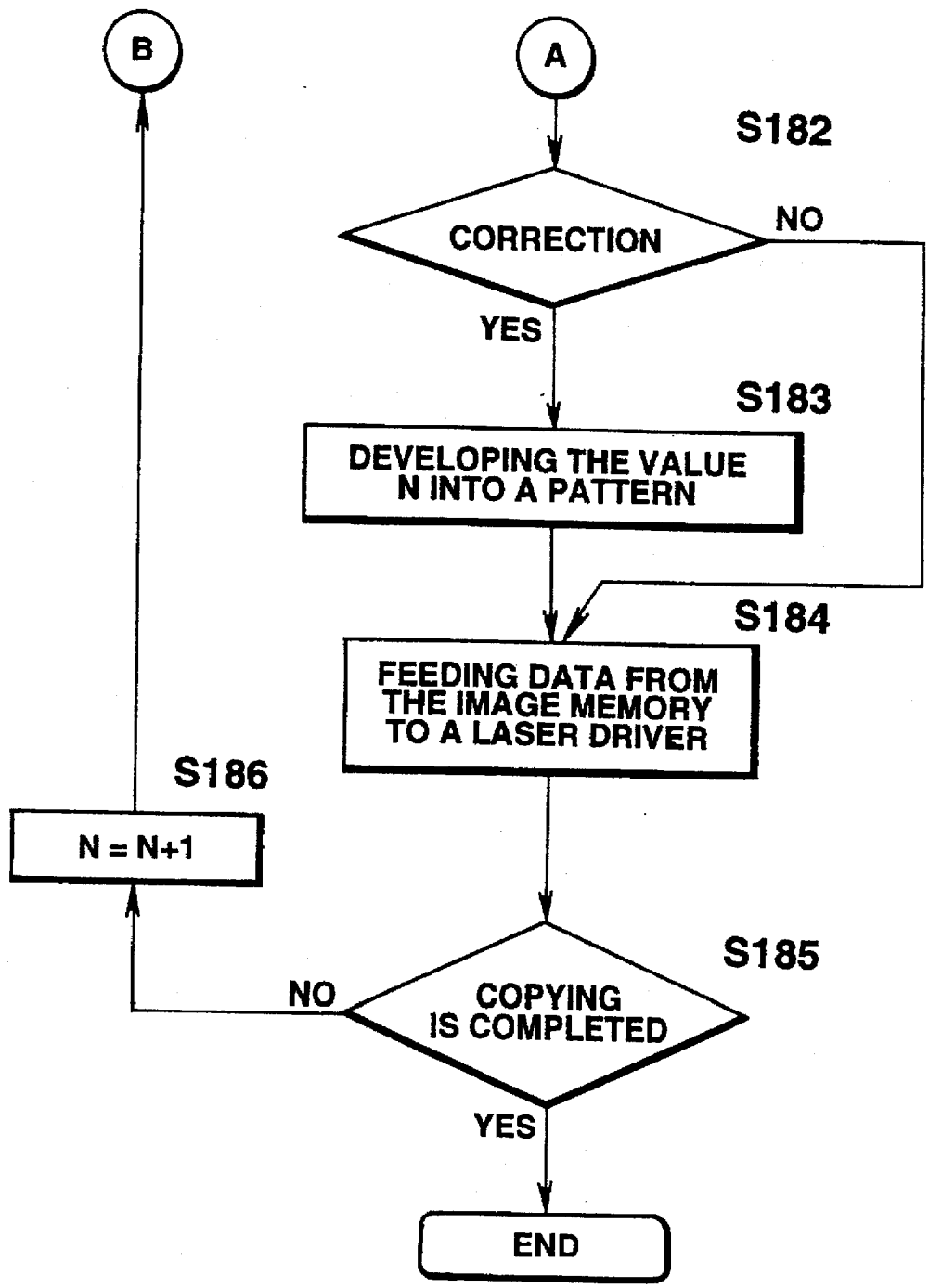
FIG. 27 is a flow chart showing a part of an explanation on operations (for erasing or replacing a page number) of the present invention as defined in claim 3.

FIGS. 26 and 27 are schematic flow charts for explaining the processing steps (claimed in claim 3) for easing the page number of an original image or for replacing it with a new one (according to an order of copying) when copying a paged original (e.g. a book) in a digital copying machine according to the present invention.

The operator selects either the page number erasing mode or the page number correcting mode by means of a page number erasing key 61 or a page number correcting key 62 provided on a control unit shown in FIG. 37. In the case of correcting a page number (Step 177 of FIG. 26) the operator must enter an initial page number for the correction of an old paging by means of the ten-key numerical keyboard 63 of the control unit (FIG. 37). The initial number is stored in a counter N (Step 178) and is printed on a first copy sheet.

An original image is scanned and stored in the image memory (Step 179 of FIG. 26).

The page number recognizing unit executes the processing operations shown in FIGS. 6, 8 to 17 and recognizes the location of the page number in the image (Step 180 of FIG. 26). All image data in the masked portion shown in FIG. 6C in the image memory is replaced with white pixels (Step 181 of FIG. 26).

In the case of correcting a page number (Step 182 of FIG. 27), a digit pattern N is written in the masked portion shown in FIG. 6 C (Step 183 of FIG. 27).

The image data stored in the image memory is transferred to a laser driver and the image is copied on a sheet of paper (Step 184 of FIG. 27). In the case of successive copying, page number N of the next image to be copied is increased by one, i.e., N+1 (Step 185 to Step 186). When the page number erasing key or the page number correcting key on the control unit is set at OFF, the copy work is considered finished.

Figure 28:
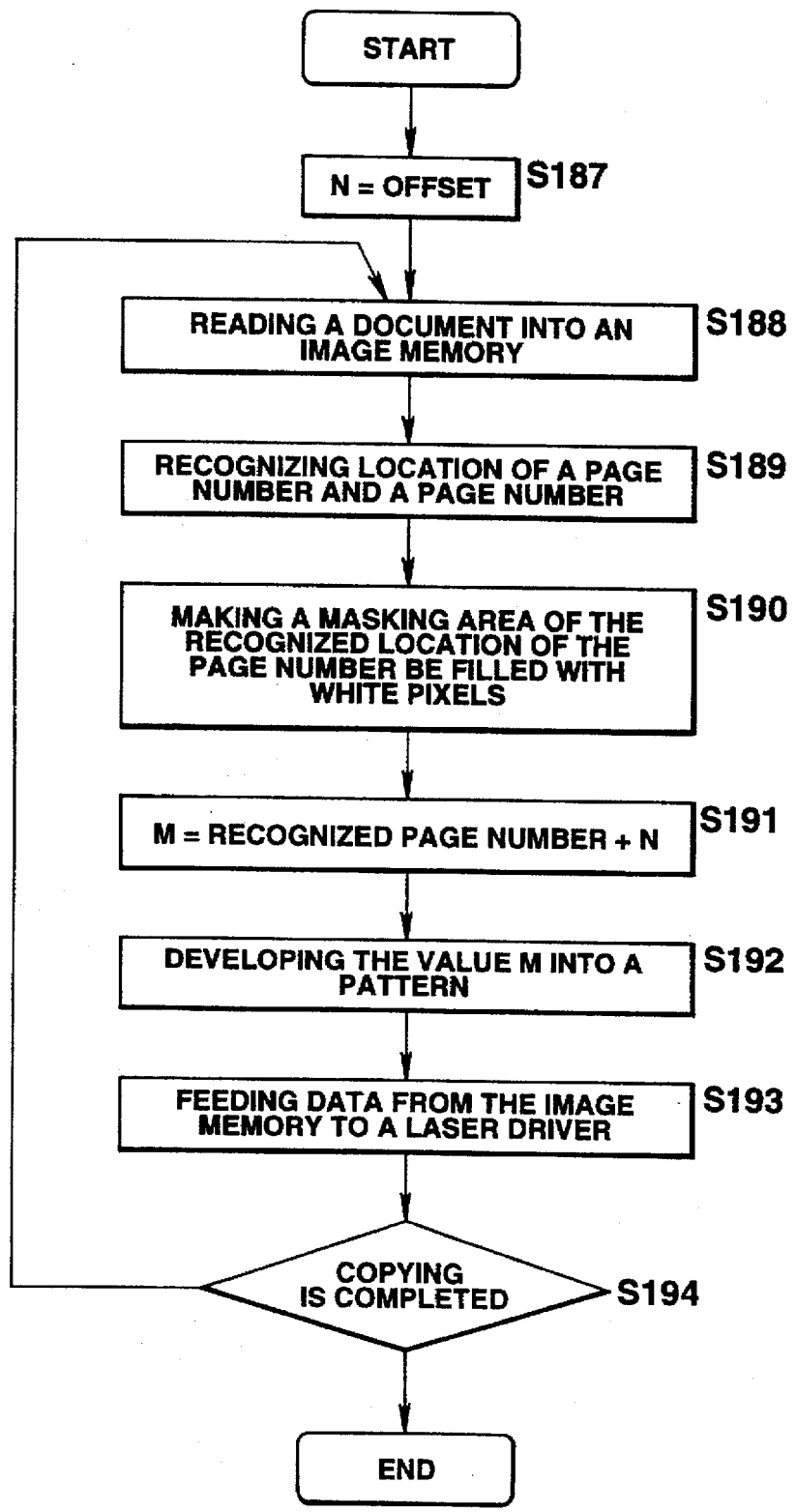
FIG. 28 is a flow chart for explaining operations (for erasing or modifying a page number) of the present invention as defined in claim 3.

FIG. 28 is a flow chart for explaining the processing steps (claimed in claim 3) for correcting the page number of an original image when copying the paged original (e.g. a book) in a digital copying machine, according to the present invention.

The operator selects the page number correcting mode by means of the page correcting key 62 provided on the control unit shown in FIG. 37 and enters an offset value for the page number of the original image by means of a ten-key numerical keyboard 63. The input offset value is set in the counter N (Step 187 of FIG. 28). In case of setting the offset value, e.g., at −10, the page number, determined by subtracting 10 from the recognized page number of the original image, is written into the image to be copied.

The original image is scanned and stored in the image memory (Step 188 of FIG. 28).

The page number recognizing unit executes the processing steps shown in FIGS. 6, 8 to 17 and recognizes the page number and its location in the original image (Step 189).

All image data in the masked portion shown in FIG. 6(c) in the image memory is replaced with white pixels (Step 190 of FIG. 28). N is added to the result of the page number recognition (Step 191). The resulting value is written as a pattern into a portion vacated at step 190 in the image memory (Step 192).

The image data stored in the image memory is transferred to a laser driver and copied on a sheet of paper (Step 193). When the page number correcting key 62 (FIG. 37) on the control unit is set at OFF, the copy work is considered finished (Step 194 of FIG. 28).

Figure 29:
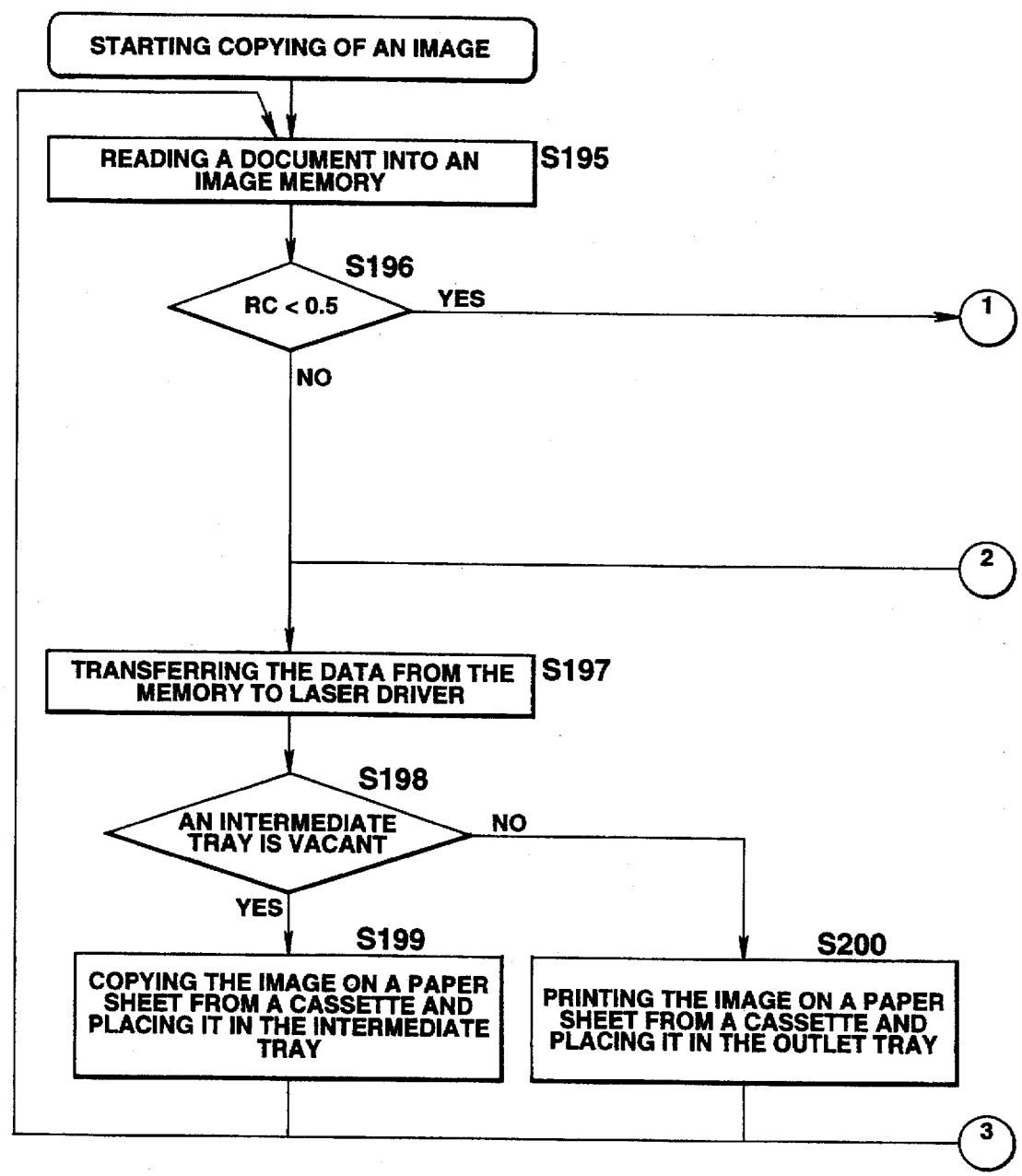
FIG. 29 is a flow chart showing a part of an explanation on operations (for detecting whether a page number exists or not and for processing according to the detection result) of the present invention as defined in claims 4 and 5.
Figure 30:
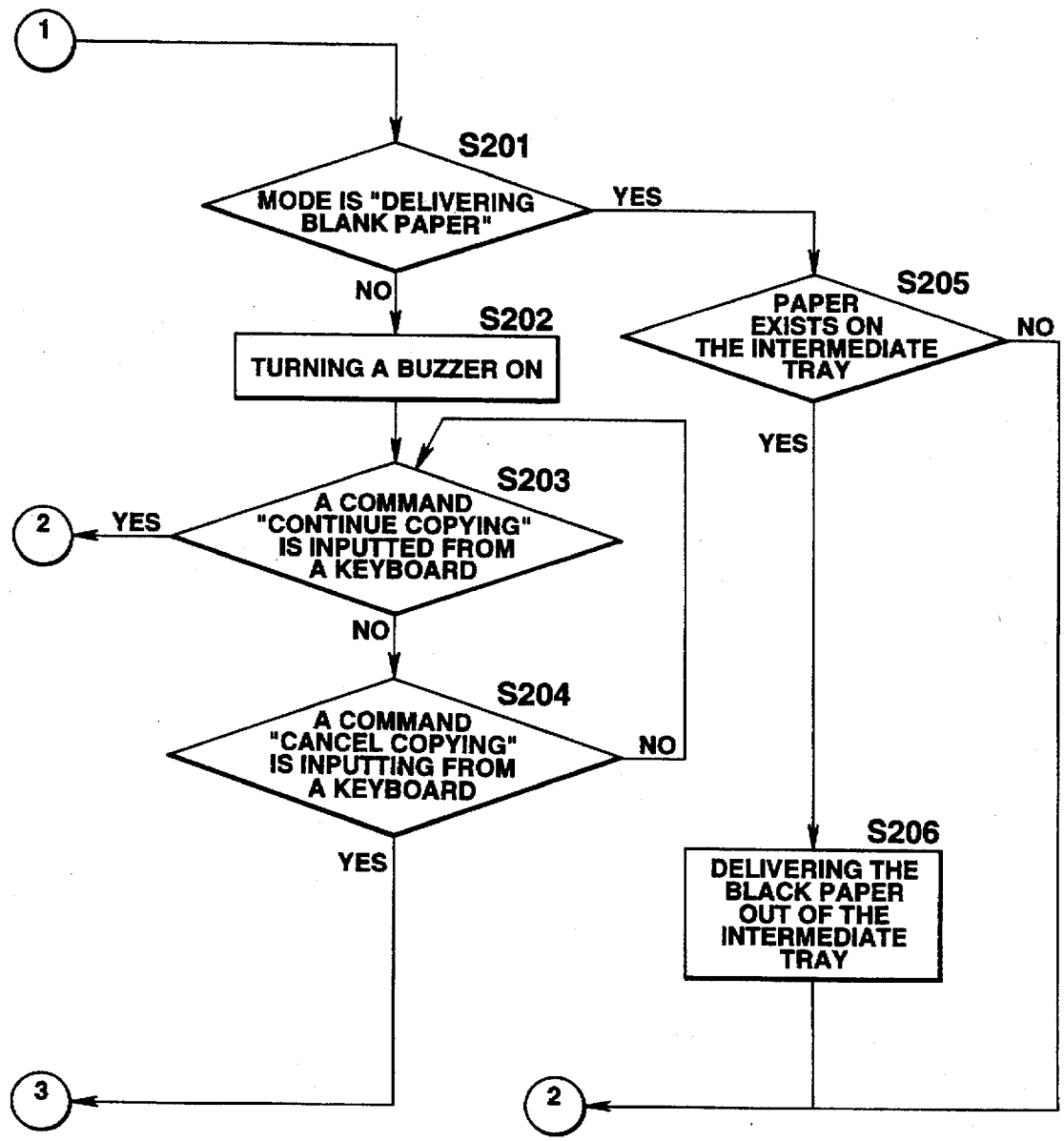
FIG. 30 is a flow chart showing a part of an explanation on operations (for detecting whether a page number exists or not and for processing according to the detection result) of the present invention as defined in claims 4 and 5.

FIGS. 29 and 30 are flow charts for explaining how to detect whether a page number exists or not and to process an image according to the detection results when copying a paged original (e.g., pages of a book) in a digital copying machine according to the present invention (these futures are claimed in claims 4 and 5).

An original image is scanned and stored in an image memory (Step 195 of FIG. 29). The page number recognizing unit executes the processing operations shown in FIGS. 6 to 21, recognizes the page number in the original image and enters the determined correlation value into RC (Step 155 of FIG. 23).

The correlation is judged to be sufficient when RC is not less than 0.5. The image data stored in the image memory are transferred to a laser driver and copying is carried out depending on the presence or absence of a sheet of paper in an intermediate tray (Step 196→Step 197→Step 198→Step 199, Step 200 of FIG. 29).

If RC is less than 0.5, the page number recognizing unit judges that there is no page number. The processing for an abnormal case is further conducted (Step 196→Step 201 of FIG. 29).

Figure 38:
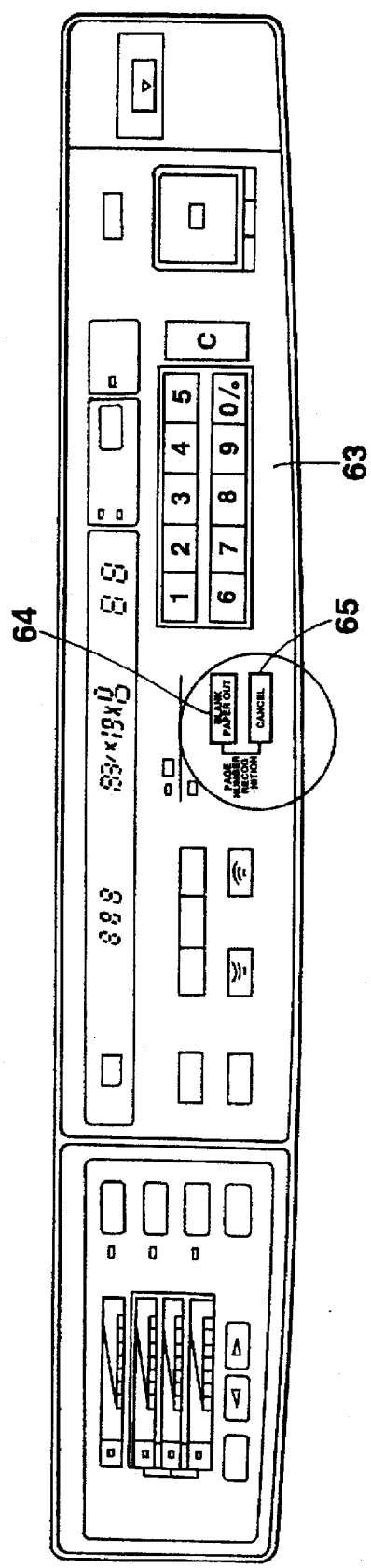
FIG. 38 is a view showing an example of a control panel of the present invention.
Figure 38A:
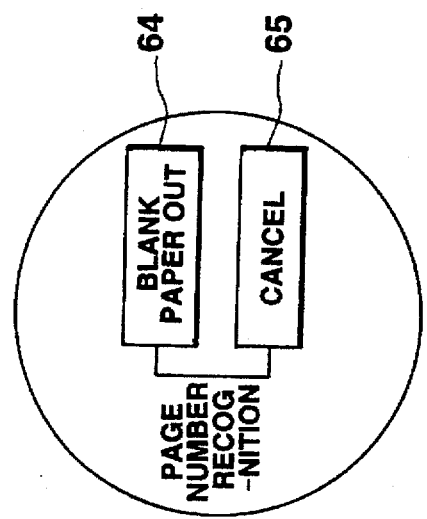
FIG. 38A is an enlarged detail thereof.

When the blank paper delivery mode 64 is selected on the control unit shown in FIG. 38, a check is made to see if the intermediate tray is vacant or occupied by a sheet of paper (Step 201→Step 205 of FIG. 30). If a sheet of paper is present in the intermediate tray, it is transferred from the tray to the outlet tray and then the image is copied onto the sheet of paper fed from the paper cassette. The image-printed sheet is then transported to the intermediate tray (Step 197 to Step 199 of FIG. 29).

When the white paper delivery mode is not selected, a buzzer actuates and continues the alarm until the operator pushes a key to continue copying or a key for cancelling the copying process (Step 203→Step 204→Step 203) of FIG. 30). When the continue key is pushed, the copying work is performed (Step 203→Step 197).

When the cancellation key is pushed, the copy work is stopped and the just read-in image data is cancelled (Step 204→S195).

FIGS. 31 to 35 are flow charts for explaining how to change an order for putting out original images according to the result of the page number recognition when copying a paged original (e.g. a book) in a digital copying machine, according to the present invention, (these futures are claimed in claims 6 to 9).

It is assumed that 3 or more originals will be copied.

Originals Nos. 1 to 3 are subsequently scanned and stored in the image memory units 34a, 34b and 34c (FIG. 5) respectively. The page number recognizing unit 37 recognizes page numbers of the 1st, 2nd and 3rd original images, e.g. 10, 11 and 9 respectively (Step 207 of FIG. 31). A memory element P[x, 1] of a page number memory 43 indicates the image memory for the original number x shown in table 1 and the memory element P[x, 2] indicates the page number.

At the moment when the three originals are scanned, the P[] is set. X[] is an index array of three elements for referring to memory elements of the page number memory 43.

At step 211, each X[i] is set so as to indicate i-th element P[] of the page number memory. N indicating the next original number is set at 4(Step 212).

Figure 31:
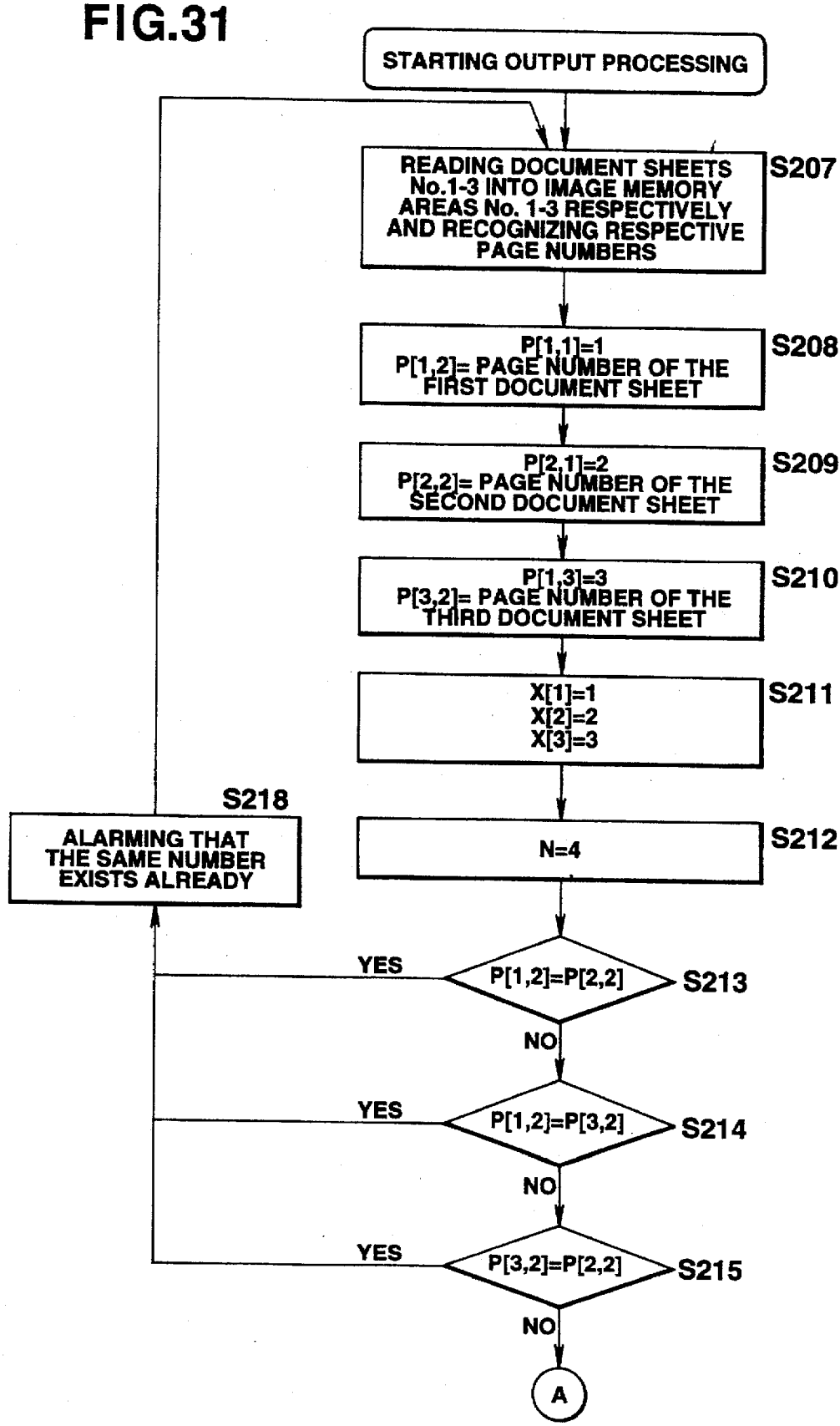
FIG. 31 is a flow chart showing a part of the procedure (for changing the order of the output of original copies having page numbers according to the result of page number recognition) of the present invention as defined in claims 6 and 9.

At this moment a check is made for double reading of the same original (Step 212 to Step 215 of FIG. 31). If the same page number is recognized twice, an alarm is set off by turning On the buzzer 46 shown in FIG. 5. The process returns to inputting the first original (Step 213, Step 214, Step 215→Step 218→Step 207). The page number P[1, 2] of the first scanned original and the page number P[3, 2] of the third scanned original are compared with each other to determine that the originals were scanned in the ascending order of their page numbers (Step 219→Step 220 of FIG. 32) or the descending order of their page numbers (Step 219→ Step 223).

When the originals are scanned in the ascending order of their page numbers, D is set at 1 to indicate the ascending order and a paper delivery path selector switch 47 (as shown in FIG. 5) is set to select the face-down tray (Step 220).

When the originals are scanned in the descending order of their page numbers, D is set at −1 and the face-up tray is selected (Step 223).

Page numbers P[1, 2] and P[2, 2] of the first original and the second original are compared with each other and the page number preceding the page number of the document to be first copied is set in PP (Step 222 and Step 225).

Figure 33:
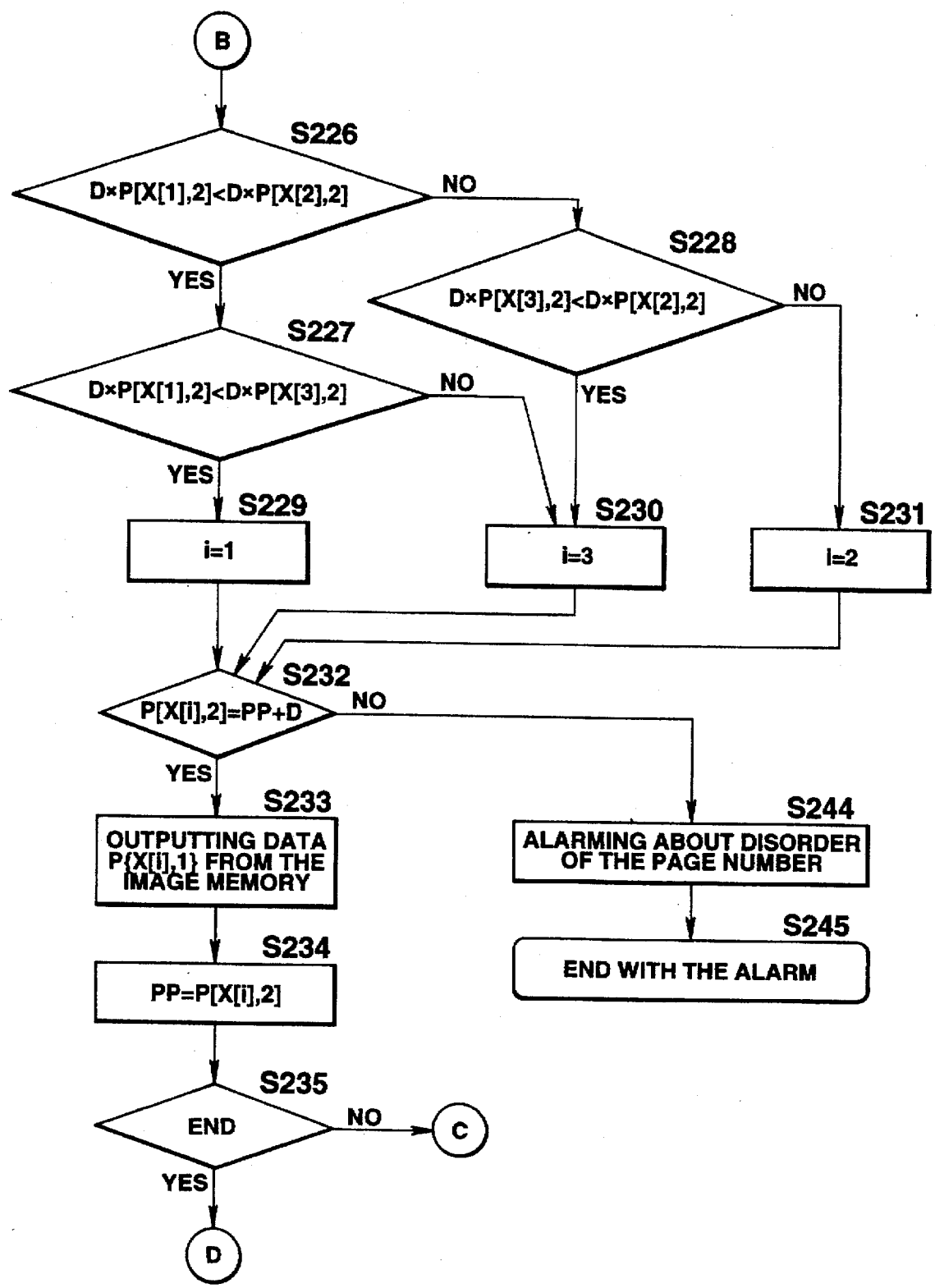
FIG. 33 is a flow chart showing a part of the procedure (for changing the order of the output of original copies having page numbers according to a result of page number recognition) of the present invention as defined in claims 6 and 9.
Figure 34:
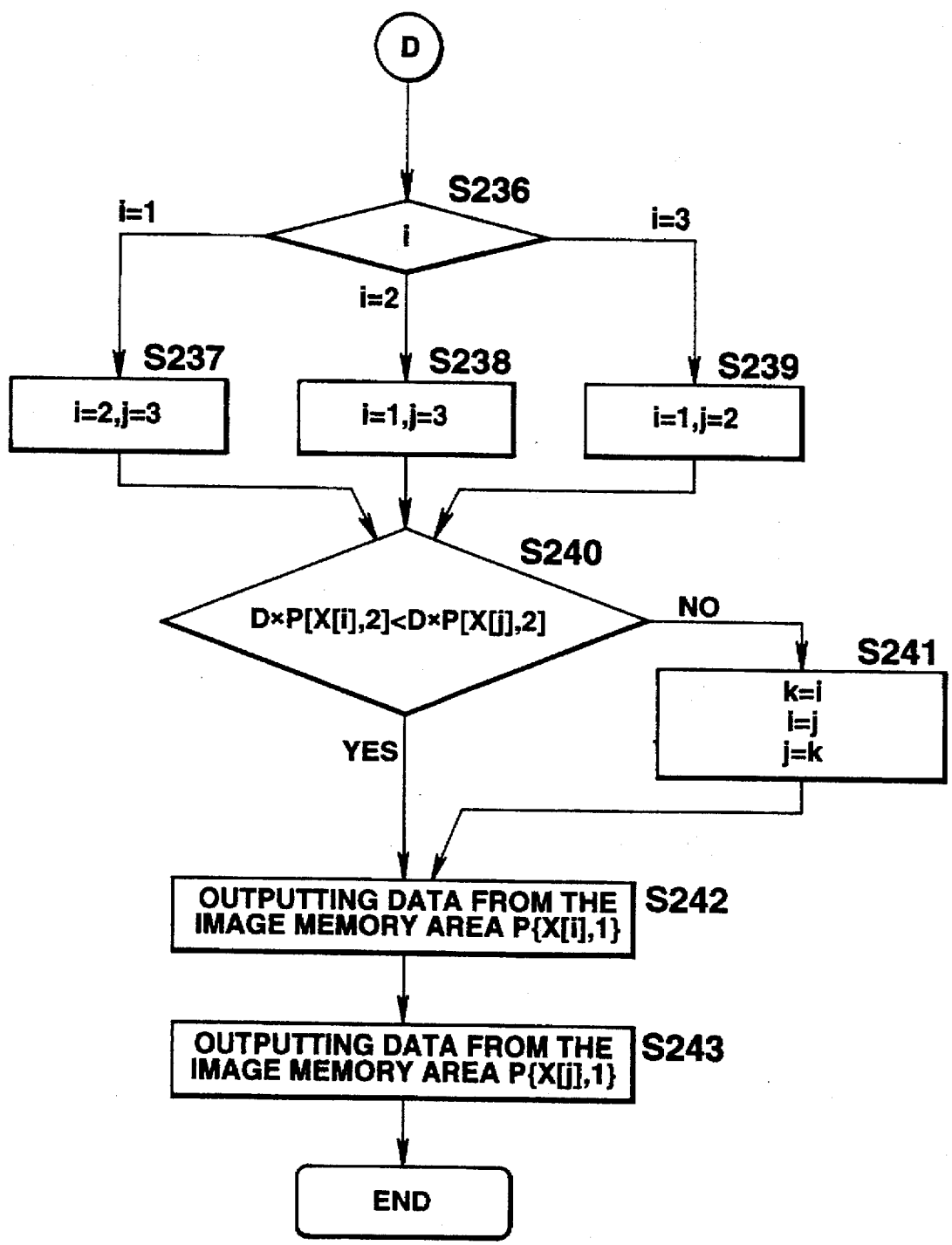
FIG. 34 is a flow chart showing a part of the procedure (for changing the order of the output of original copies having page numbers according to the result of page number recognition) of the present invention as defined in claims 6 and 9.

The page numbers of the originals X[1]–X[3] are compared and a minimal index value "i" of X[] is set (Step 226 to Step 231 of FIG. 33). The data of the original specified by X[i] is the image data to be output next. A check is made as to whether the image's page number P[X[i], 2] is equal to the value determined by adding +1 to the page number of the last output original (in the case of D=1) or by subtracting 1 from the page number (in the case of D=-1) or not. If the resulting check is NO, i.e., the page number is wrong, an alarm goes off (by actuating the buzzer 46 of FIG. 5) and further processing is cancelled (Step 232→Step 244→Step 245 of FIG. 33).

When the page number is normal, the image memory data designated by P[X[i], 1] is output (Step 232 to Step 233). The page number P[X[i], 2] is stored in PP for further checking at step 232(Step 234).

When the ending signal is input by turning to OFF a book copying key 66 on the control unit shown in FIG. 37, "i" and "j" are at a value other than the current value "i" (Step 236→Step 237, Step 238, Step 240 of FIG. 34), and page numbers indicated by "i" and "j" in P[X[i], 2] and P[X[j], 2] are compared (Step 240).

If the outputting order is from j to i, i and j are replaced with each other (Step 241). The image memory data specified by "i" and "j" are output in the designated order and the work of copying is finished.

Figure 35:
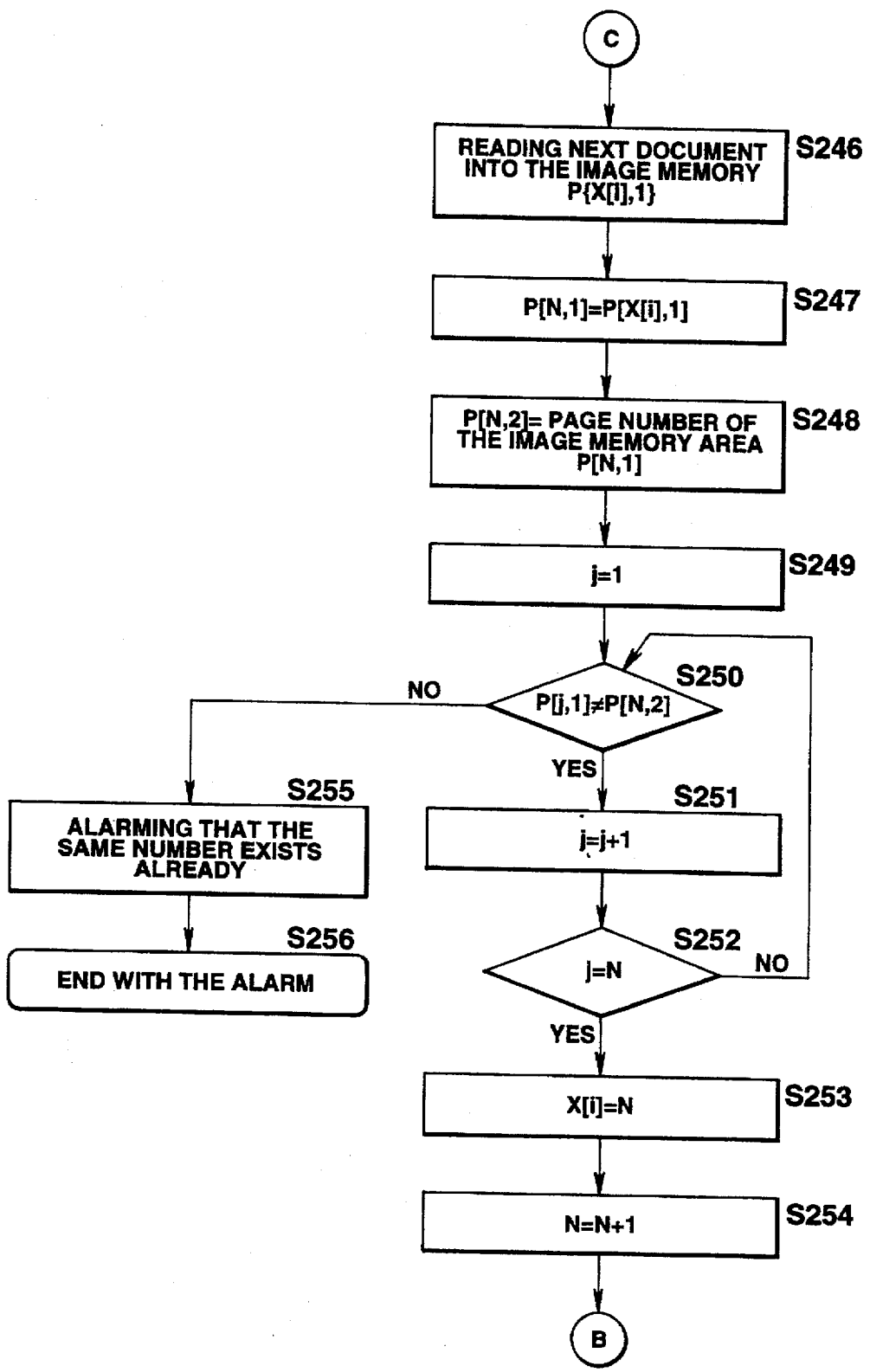
FIG. 35 is a flow chart showing a part of the procedure (for changing the order of the output of original copies having page numbers according to the result of page number recognition) of the present invention as defined in claims 6 and 9.

If the work of copying is not finished at step 235 of FIG. 33, the next original copy is read into the image memory defined by P[X[i], 1] (Step 248 of FIG. 35). Since the read-in image is of a N-th original, the image memory number P[X[i], 1] is entered into P[N, 1] and a recognized page number is entered into P[N, 2] (Step 247 and Step 248 of FIG. 35). A check is made as to whether the same number of the image has been read into the image memory (Step 249 to Step 252). If the same page number is there, an alarm goes off (by turning the buzzer ON 46 shown in FIG. 5) and the copy work ends with an alarm (Step 250→Step 255, Step 256 of FIG. 35). If the checking result is OK (Step 252 to Step 254), X[i] and N are set and the processing is returned to step 226 of FIG. 33.

In the case of table 1, the above-mentioned processing operations are as follows:

Originals Nos. 1, 2 and 3 are written into the respective image memory units 1, 2 and 3 (34a, 34b and 34c of FIG. 5) and their page numbers are recognized as 10, 11 and 9 respectively (Step 275 to Step 215 of FIG. 31).

The page number of the first original is larger than that of the third original, therefore the order of outputting the original images is judged as in a descending order.

Figure 32:
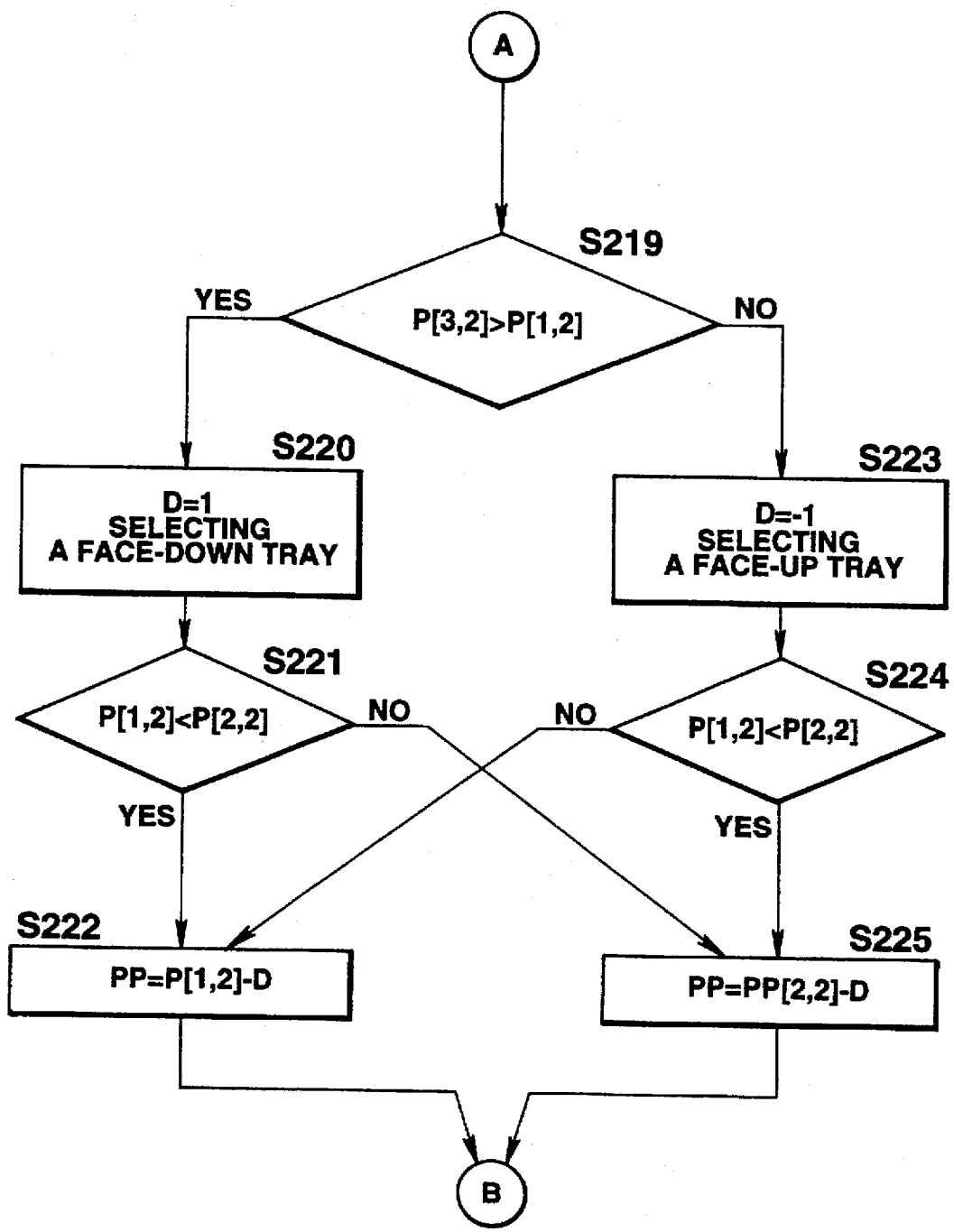
FIG. 32 is a flow chart showing a part of the procedure (for changing the order of the output of original copies having page numbers according to the result of page number recognition) of the present invention as defined in claims 6 and 9.

Consequently, the facing up tray is selected and D is set at -1 (Step 219→Step 223 of FIG. 32). Since the page number of the second original is larger than that of the first original, step 225 is executed to set PP=12.

Steps 226, 228 and 231 (FIG. 33) are performed to get i=2. At step 233 of FIG. 33, the second original image from the image memory 2 is output to get PP=P[X[2],2]=11 (Step 234).

At step 244 of FIG. 35, the fourth original is written into the image memory 2. Step 247 is performed to get P[4, 1]=P[2, 1]=2. At step 248, the recognized page number 8 is stored into P[4, 2]. X[2]=4 (Step 253) and N=5 (Step 254) are executed. Consequently, the content of X[i] becomes 1, 4 and 3 respectively at i=1, 2 and 3. The processing returns to Step 228 of FIG. 33 to process on the originals Nos. 1, 4 and 3.

Figure 36:
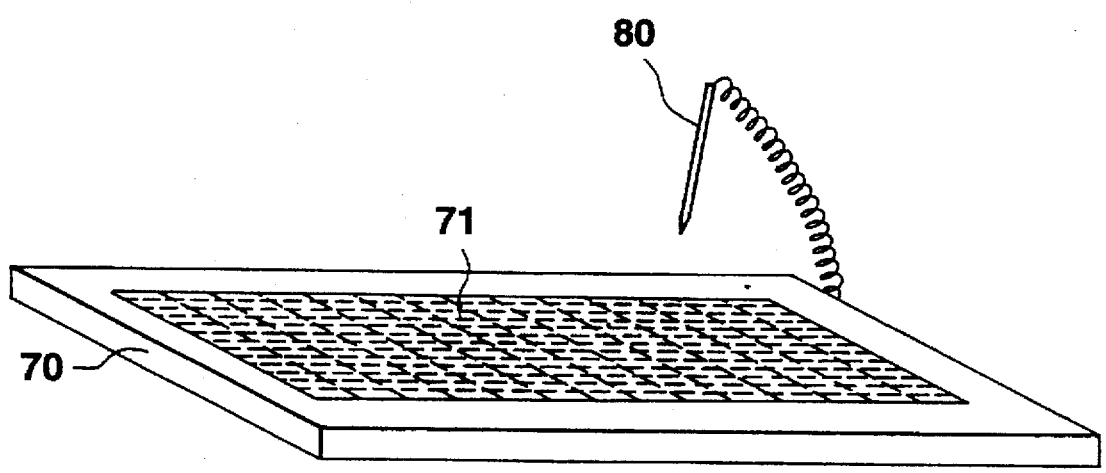
FIG. 36 is a view showing an example of a construction of an editor for allowing an operator to input data on a page number position.

FIG. 36 illustrates an example of an editing device which is used by a user for inputting the location of a page number according to a method differing from that of FIG. 6.

Before starting the work of copying, the user places a document on an editing (coordinate input) device 70 and designates the location of its page number by the use of a pen 80.

An input portion has matrix-like conductors which produce a magnetic field using a time division. A tip sensor of the pen senses a magnetic force to generate the information on coordinates by detection timing.

I claim:

1. A copying machine which is capable of copying onto both faces of a paper sheet, comprising a page number recognizing unit for recognizing a page number on an original image, and a control unit which, prior to printing, and according to the recognition made by the page number recognizing unit, adjusts image positioning and thereby defines adequate respective side margins on a top face and a reverse face of each of a plurality of paper sheets to be printed on both faces with images of consecutive pages in such a way that those respective side margins on an even-numbered page and on an odd-numbered page of each paper sheet are arranged in aligned relation to each other, on opposing faces thereof.

2. A copying machine which is capable of copying onto both sides of a paper sheet, comprising a page number recognizing unit for recognizing a page number on an original image and a control unit which changes at least one of: the order of the images to be copied and the path for delivering a sheet of paper, according to the recognition made by the page number recognizing unit.

3. A copying machine as defined in claim 2, further comprising:

a memory unit which stores page numbers recognized by the page number recognizing unit and an alarming unit generates an alarm signal when a currently scanned page number coincides with a page number already stored in the memory unit or sequentially scanned original images exceed a capacity of a changing unit for changing a sequence in which images to be copied are output onto said sheet.

4. A copying machine as defined in claim 2, characterized in that the page number recognizing unit identifies an area containing different color picture elements other than the background and recognizes a pattern of numerals, existing in a convex -bordered portion or an isolated portions as a page number.

5. A copying machine as defined in claim 2, characterized in that the page number recognizing unit recognizes a pattern of numerals, existing near a position of a signal inputted by an operator through a coordinate input device as a page number.

* * * * *